United States Patent [19]

Miyabayashi et al.

[11] Patent Number: 5,792,822
[45] Date of Patent: Aug. 11, 1998

[54] TRANSPARENT PLASTIC MATERIAL, OPTICAL ARTICLE BASED ON THE MATERIAL, AND PRODUCTION METHOD THEREOF

[75] Inventors: Toshiyuki Miyabayashi; Jun Kinoshita, both of Suwa, Japan

[73] Assignee: Seiko Epson Corporation, Tokyo, Japan

[21] Appl. No.: 601,034

[22] PCT Filed: Jun. 19, 1995

[86] PCT No.: PCT/JP95/01212

§ 371 Date: Feb. 23, 1996

§ 102(e) Date: Feb. 23, 1996

[87] PCT Pub. No.: WO96/00247

PCT Pub. Date: Jan. 4, 1996

[30] Foreign Application Priority Data

Jun. 24, 1994 [JP] Japan ................................. 6-143443

[51] Int. Cl.$^6$ .......................................................... C08F 30/04
[52] U.S. Cl. ................... 526/240; 526/241; 526/266; 526/286
[58] Field of Search .............................. 428/1; 524/400; 526/240, 241, 266, 268

[56] References Cited

U.S. PATENT DOCUMENTS 5,384,379  1/1995  Bader et al. ........................... 526/289

FOREIGN PATENT DOCUMENTS

WO93/01233  1/1993  WIPO.

Primary Examiner—Jeffrey T. Smith
Attorney, Agent, or Firm—Sughrue, Mion, Zinn, Macpeak & Seas, PLLC

[57] ABSTRACT

A transparent plastic material and an optical article formed of the material which have no variation in color, no generation of precipitation, properties to selectively absorb only light of a specific wavelength, selectively block or reduce light of a wavelength which is dazzling to human eyes, and block harmful ultraviolet light. A transparent plastic material includes a polymer obtained by polymerizing one or more polymerizable monomers in the presence of a polymerization initiator or polymerization catalyst, wherein the polymer contains a complex compound of Formula (I):

$$A_2M(OH)(H_2O) \qquad (I)$$

wherein M denotes Sc, Y, La, Pt, Nd, Pm, Sm, Gd, Dy, Ho, Er, Tm, or Lu; A is a ligand for forming a chelate complex having a structure shown below

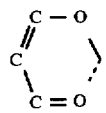

and containing at least one of an aryl group and a heterocyclic group.

31 Claims, 19 Drawing Sheets

Spectral characteristics of the lens of Example 1

Spectral characteristics of the lens of Example 2

Spectral characteristics of the lens of Example 3

Spectral characteristics of the lens of Example 4

Amount of aquahydroxy(1-phenyl-1,3-butanedionato) neodymium in Test Example 4 and absorbance at the characteristic absorption wavelength of neodymium atom Thickness of the molding of Example 18 and absorbance at 580 nm Amount of aquahydroxy(1-phenyl-1,3-butanedionato) neodymium in the molding of Example 24 and fatigue Thickness of molding containing aquahydroxy(1-phenyl-1,3-butanedionato)neodymium of Example 24 and fatigue Thickness of molding (for content of 2 phm)

Changes over time of the molding of Test Example 5 under irradiation with fluorescent lamp ○, △ : Example: aquahydroxy(1-phenyl-1,3-butanedionato) neodymium
●, ▲ : Test Example: Trisbenzoylacetonatoneodymium Under irradiation : ○, ●
In dark place   : △, ▲

Changes over time of the molding of Test Example 6 under irradiation with fluorescent lamp ○, △ : Example: aquahydroxy(1-phenyl-1,3-butanedionato) neodymium
●, ▲ : Test Example: Trisbenzoylacetonatoneodymium Under irradiation : ○, ●
In dark place : △, ▲

Changes over time of aquahydroxy(1-phenyl-1,3-butanedionato)neodymium – styrene solution of Test Example 8 under irradiation with fluorescent lamp Fig 15 Infrared absorption spectrum of aquahydroxy(1-phenyl-1,3-butanedionato)neodymium complex Visible/ultraviolet absorption spectrum of 2% toluene solution of aquahydroxy(1-phenyl-1,3-butanedionato)neodymium complex Visible/ultraviolet absorption spectrum of 2% toluene solution of trisbenzoylacetonatoneodymium

Fig 19
Steric structure of aquahydroxy(1-phenyl-1,3-butanedionato)neodymium complex
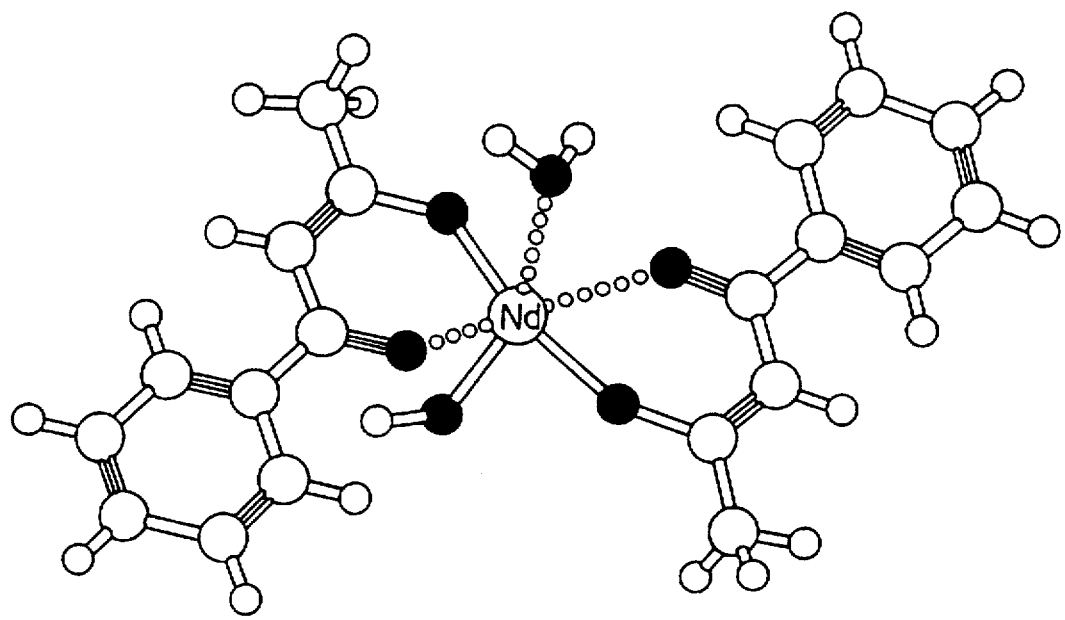
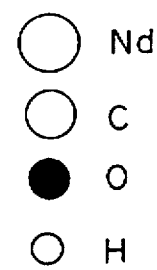

TRANSPARENT PLASTIC MATERIAL, OPTICAL ARTICLE BASED ON THE MATERIAL, AND PRODUCTION METHOD THEREOF

FIELD OF THE INVENTION

This invention relates to a transparent plastic material which selectively blocks only light of a specific wavelength and having the function to blocking ultraviolet which does harm to human eyes and selectively blocking or reducing light of a specific wavelength which is dazzling to the human eye, easier to be manufactured and lighter than conventional materials and stable over time, and an optical article comprising the material.

BACKGROUND OF THE INVENTION

When adapted to light, the human eye perceives light in the vicinity of 555 nm (520 to 590 nm) in wavelength to be the brightest, and when adapted to the dark, the human eye perceives light in the vicinity of 507 nm (472 to 542 nm) in wavelength to be the brightest. This is the reason why a person feels dazzled when he rapidly enters a dark place from a dark place or, to the contrary, nothing is visible for a time when he enters a light place from a dark place. Further, the above phenomenon is also the reason why he feels very dazzled under strong sunlight such as outdoors in the daytime during fine weather, at the seashore or mountains in summer. As a result, to prevent such glare, sunglasses are generally used. However, since sunglasses use only colored lenses, the sight becomes dark. Further, those lenses which do not appropriately absorb ultraviolet light (do not block ultraviolet light) expand the pupil due to the darkness of the sight allowing the amount of ultraviolet light entering the eye to increase. This ultraviolet light is harmful to the human eye, and light of 280 to 315 nm in wavelength (UV-B) is said to be absorbed by the cornea to cause difficulties for the cornea such as inflammation of the cornea. Further, ultraviolet light of 300 to 400 nm in wavelength (UV-A) is said to reach the lens of the eye and is absorbed, and extended exposure to ultraviolet light is considered to be a cause of senile cataract. Therefore, sunglasses which do not cut ultraviolet light cause heavy physiological burden to the eyes. Further, to prevent the occurrence of cataract, it is necessary to cut ultraviolet light which is harmful to the lens of the eye.

Neodymium compounds, which are rare earth compounds, have a sharp absorption in the vicinity of 570 to 590 nm and can selectively absorb only light of wavelengths which are dazzling to human eyes. Therefore, utilizing these properties, neodymium compounds are incorporated into glass to endow eyeglass lenses and automobile mirrors with glare-proof properties. At the same time, introduction of neodymium compounds into transparent plastics to obtain highly transparent optical plastics with glare-proof properties has been investigated. Some examples are given below:

(1) Japanese Patent Publication 42-3949/1967

This patent discloses a method for producing a light blocker in which an organic thin film from a water-soluble polyether containing a water-soluble rare earth metal salt such as neodymium or cerium is attached to the inner surface of a mold comprising glass or a metal, and a inethacrylic ester or an acrylic ester and a prepolymer of an a,b-unsaturated carboxylic acid are injected into a mold, followed by heat polymerization.

(2) Japanese Patent Laid-open Publication (OPI)51-56851/1976

This patent discloses a resin composition comprising an inorganic neodymium compound such as neodymium phosphate, neodymium carbonate, neodymium sulfate, neodymium oxide, or neodymium nitrate mixed with a synthetic resin.

(3) Japanese OPI 51-58444/1976

This patent discloses a resin composition comprising an organic neodymium compound such as neodymium ethylenediamine-tetraacetate, neodymium acetate, or neodymium stearate mixed into a synthetic resin such as methylmethacrylate resin or styrene resin.

(4) Japanese OPI 58-225148/1983

This patent proposes a selective light absorbing resin composition for the visible light region comprising particles of a neodymium compound such as neodymium oxide, neodymium hydroxide, neodymium carbonate, neodymium phosphate, neodymium sulfate, neodymium chloride, or neodymium acetate having an average particle diameter of 0.2 to 20 μm dispersed in a transparent plastic base material.

However, conventional neodymium compounds such as neodymium oxide, neodymium carbonate, neodymium chloride, neodymium nitrate, neodymium sulfate, neodymium sulfide, neodymium oxalate, and neodymium acetate are less compatible with and sparingly soluble in typical polymerizable monomers such as diethyleneglycolbisallylcarbonate, methylmethacrylate, and styrene which form transparent plastics.

Therefore, when the inorganic neodymium compound of (2) is kneaded with an organic synthetic resin such as a methylmethacrylate resin or a styrene resin, uniform mixing is difficult because of insufficient compatibility of the materials.

With the organic neodymium compound of (3), when it is heated and kneaded with methylmethacrylate resin, uniform dispersion is difficult and a transparent resin material is not obtained.

With (4), since the total light transmissivity is low too, a highly transparent resin is not obtained.

(5) Japanese Patent Publication 44-5091/1969

This patent proposes that, since neodymium acetate is less compatible with methylmethacrylate resin, a method in which the neodymium salt is made compatible with methylmethacrylate using anhydrous stannic chloride as a solvent, which is cast by heat polymerization.

However, this method is not only high in cost since casting is made using stannic chloride as a solvent, but also the resulting resin is not completely transparent because of a turbidity due to the dispersed fine particles, and has problems of low weather resistance and tendency to devitrification.

The other way obtaining optical elements is also proposed here,in which water soluble metallic salt such as neodymium acetate, neodymium chloride,neodymium nitrate, neodymium sulfate,or stealilic neodymium is dissolved in hydrophilic monomers such as 2-hydroxyethylmethacrylate, methacrylic acid, or acrylic acid,and is used together with the other hydrophobic monomers.

(6) Japanese OPI 01-161024/1989

This patent discloses a method in which, making use of the fact that neodymium nitrate, which is considered to be less compatible with polymerizable monomers, is soluble in 2-hydroxyethylmethacrylate, the solution is mixed with methylmethacrylate or acryl-diglycolcarbonate as a monomer, or mixed with polyvinylalcohol as a polymer, and heat polymerized to form a glare-proof plate or film. Furthermore, 2-hydroxyethylmethacrylate must always be present, which tends to adversely effect the properties of the resulting polymer. Specifically, since a polymer containing 2-hydroxyethylmethacrylate has the disadvantages of high water absorption and poor thermal characteristics, the polymer tends to deform due to water absorption or on heating. Especially for optical elements, since deformation directly affects the optical characteristics, deformation should be as small as possible. Moreover, in many cases, optical elements are renderd anti-reflective effect by forming an inorganic deposited film on the surface of the transparent plastic material. However, when deformation occurs in the substrate, the stress produces cracks in the deposited film, which leads to a degradation in optical performance.

(7) Japanese OPI 02-153301

This patent discloses a plastic-based optical element comprising a polymer obtained by polymerizing a monomer mixture containing at least one neodymium compound selected from the group consisting of neodymium acrylate and neodymium methacrylate, at least one unsaturated carboxylic acid selected from the group consisting of acrylic acid and methacrylic acid, and styrene or a styrene derivative.

In this method, since acrylic acid or methacrylic acid are copresent, the polymer has high water absorptivity and has similar problems as the method (6).

(8) Japanese Patent Publication 05-64179/1993

This patent proposes a production method for a rare earth element containing resin composition which has superior selective absorption of radiation and electromagnetic waves, characterized in that a mixture of a resin mainly comprising methacrylic acid ester, at least one rare earth element compound selected from the group consisting of the oxide, hydroxide, complex, or salt of inorganic acid of lanthanum, cerium, praseodymium, dysprosium, thulium, ytterbium, and lutetium, at least one solvent selected from the group consisting of compounds of the formula $R_1$—COOH solubilie in the above two components (wherein $R_1$ is a saturated or unsaturated hydrocarbon residue of 1 to 20 carbon atoms); $R_2$—OCO—$R_3$—COOH (wherein $R_2$ is a hydrogen atom or a hydrocarbon residue of 1 to 9 carbon atoms, $R_3$ is a saturated or unsaturated hydrocarbon residue of 1 to 4 carbon atoms); $CH_2$=($R_4$)—COO—(—$A_1$—O—)nH (wherein $R_4$ is a hydrogen atom or a methyl group, $A_1$ is an alkylene group of 2 to 6 carbon atoms, and n is 0 or an integer from 1 to 10); $CH_2$=C($R_5$)—COO—$R_6$—OH (wherein $R_5$ is a hydrogen atom or a methyl group, $R_6$ an alkylene group of 2 to 6 carbon atoms); $R_7$—OH (wherein $R_7$ is a saturated or unsaturated hydrocarbon residue of 3 to 10 carbon atoms); and $R_8$—(—$A_2$—O—)nH (wherein $R_8$ is a hydroxy group or a saturated or unsaturated hydrocarbon residue of 1 to 10 carbon atoms, $A_2$ is an alkylene group of 2 to 4 carbon atoms, and m is an integer from 1 to 10), and a polymerization initiator is polymerized in a mold.

However, since this method uses an unsaturated carboxylic acid such as methacrylic acid or acrylic acid, a saturated or unsaturated fatty acid such as propionic acid, isobutyric acid, n-butyric acid, caproic acid, caprylic acid, capric acid, 2-ethylhexanoic acid, stearic acid, or naphthenic acid, an unsaturated alcohol such as α-hydroxyethylacrylate or α-hydroxyethylmethacrylate; a saturated aliphatic alcohol such as propylenealcohol or cyclohexylalcohol, or a polyhydric alcohol such as ethyleneglycol, diethyleneglycol, or propyleneglycol, is used as a co-solvent to uniformly dissolve the rare earth element compound in the resin material, therefore the resin has an increased water absorptivity and tends to have problems similar to those shown in the method (6).

(9) Japanese Patent Publication 05-52325/1993

This patent discloses a production method of a neodymium containing transparent resin in which in a mixture of one monomer selected from the group consisting of alkylmethacrylate, the alkyl group having 1 to 4 carbon atoms, and styrene, at least one compound selected from the group consisting of acrylic acid and/or methacrylic acid, and a saturated or unsaturated organic carboxylic acid of 6 to 20 carbon atoms which may be substituted with a hydroxyl group or an alkoxycarbonyl group, and water, a water-soluble inorganic strong acid salt of neodymium and a water-soluble inorganic acid are reacted in a ratio satisfying a specified range to obtain a monomer composition, and the monomer composition, as is, is polymerized.

However, since this method also uses acrylic acid and/or methacrylic acid as in method (7), and further at least one compound selected from the group consisting of saturated or unsaturated organic carboxylic acids of 6 to 20 total carbon atoms which may be substituted with a hydroxy group or an alkoxycarbonyl group and a water-soluble inorganic acid salt of neodymium, the resin has a high water absorptivity and thus has problems similar to those of method (6).

(10) Japanese Patent Publication 05-79684/1993

This patent discloses a neodymium containing transparent resin which is a reaction product comprising at least one compound selected from the group consisting of a copolymer comprising a monomer comprising styrene alone or an alkylmethacrylate of 1 to 4 carbon atoms mainly comprising styrene and at least one compound selected from the group consisting of acrylic acid, methacrylic acid, neodymium acrylate and neodymium methacrylate, and neodymium salt thereof, wherein the number of carboxyl groups of the organic carboxylic acid and salt thereof to the total number of carboxyl group of the acrylic acid, methacrylic acid, and salt thereof is x, and the ratio of carboxyl groups forming a salt neutralizing neodymium of all of the carboxyl groups is y, and x and y satisfy one of the following formulas I, II, and III.

[Formula 1]

$0.05 \leq y \leq (5/2)x+0.2, 0 \leq x \leq 0.3$   (Formula I)

$0.05 \leq y \leq -(5/2)(x-0.3)+0.95, 0.3 \leq x \leq 0.05$   (Formula II)

$0.05 \leq y \leq -(8/3)(x-0.55)+0.85\ 0.55 \leq x \leq 0.85$   (Formula III)

However, in this method, since methacrylic acid, acrylic acid, or a saturated or unsaturated organic carboxylic acid of 6 to 21 carbon atoms unsubstituted or substituted with a hydroxy group is present, the resin also has problems similar to those of method (6).

As described above, rare earth compounds such as conventional neodymium compounds have problems of poor compatibility with hydrophobic polymerizable monomers. The various methods set forth above have been used to eliminate such problems, but these methods have problems of water absorption by the resins, and are thus defective in dimensional stability when used as optical elements. On the other hand, transparent materials such as eyeglass lenses and contact lenses contain ultraviolet absorbers to block ultraviolet light. However, ultraviolet absorbers tend to have problems in terms of compatibility with polymerizable monomers, but use of several types of additives or large amounts of ultraviolet absorbers deteriorates the mechanical characteristics of the polymers. Also when transparent plastic materials having a glare-proof function are used in eyeglass lenses or contact lenses, compounds having a glare-proof function and ultraviolet absorbers must generally be added to the polymerizable monomers for the above purpose, which may have problems in terms of compatibility and mechanical characteristics.

The inventors have proposed a transparent plastic material which functions to solve such problems and selectively block or reduce light of a specific wavelength in Japanese Patent Application 05-502109 (PCT/JP92/00883; International Open WO93/01233: U.S. Ser. No. 08/027,173).

However, the complex compound having the basic structure shown below and containing at least one of an aryl group and a heterocyclic group:

(A)n M (wherein n is 3, M denotes Sc, Y, La, Ce, Pr, Nd, Pm, Sm, Eu, Gd, Tb, Dy, Ho, Er, Tm, Yb, or Lu.) has been found to have problems of (1) precipitated when dissolved in polymerizable monomers after decomposed gradually in the state of a crystal, and (2) when the complex compound is dissolved in a polymerizable monomer and irradiated with light of a fluorescent lamp or the like at room temperature, the material has tints specific to the individual rare earth elements initially, but tends to discolor and precipitate with the passage of time.

Therefore, the transparent plastic material of Japanese Patent Application 05-502109 (PCT/JP0083) using the complex compound has large variation of color due to a problem in chemical stability of the complex compound and the occurrence of precipitation.

SUMMARY OF THE INVENTION

With a view to eliminate such problems, a primary object of the present invention is to provide a transparent plastic material and optical articles comprising the material which do not vary in tints and precipitation, does not occur have properties of selectively absorbing only light of a specific wavelength, selectively blocking or reducing light of wavelengths dazzling to the human eye, and blocking harmful ultraviolet light.

Accordingly the present invention, which attains the above object, provides a transparent plastic material and optical articles comprising the material which do not vary in tints and where precipitation does not occur, and which have high transparency, selective absorption to light of a specific wavelength, and absorption of harmful ultraviolet light, comprising a polymer obtained by polymerizing a composition comprising (i)at least one polymerizable monomer and (ii)a polymerization initiator or polymerization catalyst, and containing (iii)a complex compound of Formula(I).

$$A_2M(OH)(H_2O) \qquad (I)$$

wherein M denotes Sc, Y, La, Pt, Nd, Pm, Sm, Gd, Dy, Ho, Er, Tm, or Lu; A is a ligand for forming a chelate complex having a structure shown below

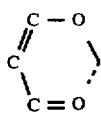

and containing at least one of an aryl group and a heterocyclic group.

The transparent plastic material of a second invention wherein the polymerizable monomer contains a radical polymerizable group.

The transparent plastic material of a third invention wherein the polymerizable monomer contains a polyaddition polymerizable group.

The transparent plastic material of a fourth invention wherein the polymerizable monomer contains a polycondensation polymerizable group.

Optical articles of a fifth invention comprise the transparent plastic material of the first invention.

The optical articles of a sixth invention wherein, in the fifth invention, the optical articles are eyeglass lenses.

The optical articles of a seventh invention wherein, in the fifth invention, the optical articles are farsighted eyeglass lenses.

The optical articles of an eighth invention wherein, in the fifth invention, the optical articles are contact lenses.

The optical articles of a ninth invention wherein, in the fifth invention, the optical articles are display filters.

The optical articles of a tenth invention wherein, in the fifth invention, the optical articles are optical apparatus lenses or filters.

The optical articles of an eleventh invention wherein, in the fifth invention, a thin film layer of the polymer as first invention is formed on a substrate comprising the transparent plastic material.

The optical article of a twelfth invention wherein, in the optical article of the eleventh invention, the substrate comprising the transparent plastic material is an eyeglass lens, sunglasses, a display filter cover, a lighting apparatus cover, an automotive mirror, and an optical apparatus lens and a filter for cameras.

A production method of an optical article of a thirteenth invention wherein, in the optical article of the fifth invention, a composition comprising one or more polymerizable monomers as described above, a polymerization initiator or catalyst, and a complex compound of Formula (I) is injected into a mold and polymerized.

A production method of an optical article of a fourteenth invention wherein, in an optical article of the fifth invention, a polymer obtained by polymerizing a composition comprising one or more polymerizable monomers of the first invention and a polymerization initiator or catalyst is melted, mixed with a complex compound of Formula (I), uniformly dissolved, and solidified as a pellet, the pellet is re-melted using a molding machine such as an injection molding machine or the like, and re-solidified in a molding die to obtain an optical article.

A production method of an optical article of a fifteenth invention is characterized in that, in the optical articles of the fifth invention, a polymer obtained by polymerizing a composition comprising one or more polymerizable monomers of the first invention and a polymerization initiator or catalyst is mixed with a complex compound of Formula (I) in a molding machine such as an injection molding machine or the like, and solidified in a molding die to obtain an optical article.

A production method of an optical article of a sixteenth invention wherein, in an optical article of the fifth invention, a polymer obtained by polymerizing a composition comprising one or more polymerizable monomers in the presence of a polymerization initiator or catalyst is mixed with a complex compound of Formula (I) in a molding machine such as an injection molding machine, and solidified in a molding die to obtain an optical article.

The transparent plastic material of a seventeenth invention wherein the polymer of the second invention comprises a styrene-based transparent plastic material mainly comprising styrene and/or a styrene derivative.

The transparent plastic material of an eighteenth invention wherein the polymer of the second invention comprises an insocyanurate type transparent plastic material mainly comprising an isocyanurate derivative having a triazine skeleton and a radical polymerizable group.

The transparent plastic material of a nineteenth invention wherein the polymer of the second invention comprises a urethane(meth)acrylate type transparent plastic material mainly comprising urethane(meth)acrylate obtained by reacting an isocyanate group containing compound with a hydroxy group containing compound.

The transparent plastic material of a twentieth invention wherein the polymer of the second invention comprises a polyester(meth)acrylate type transparent plastic material mainly comprising a polyester(meth)acrylate having a polyester structure in the molecule.

The transparent plastic material of a twenty-first invention wherein the polymer of the second invention comprises a sulfur-containing (meth)acrylate type transparent plastic material mainly comprising a sulfur-containing (meth) acrylate containing sulfur atom in the molecule.

An optical article of a twenty-second invention wherein the optical article comprises a polymer obtained by polymerizing radical polymerizable monomers comprising 40 to 60 parts by weight of a (meth)acrylate of Formula (II) containing a sulfur atom in the molecule, 10 to 30 parts by weight of an aromatic (meth)acrylate, 10 to 30 parts by weight of an aliphatic (meth)acrylate, and 10 to 30 parts by weight of polyethyleneglycoldimethacrylate in the presence of a radical polymerization initiator, and the optical article comprising a transparent plastic material wherein the polymer contains the complex compound of Formula (I) is an eyeglass lens.

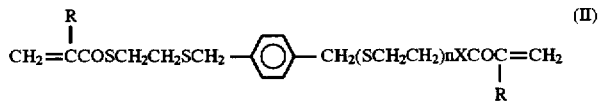

(II)

wherein R is a hydrogen atom or a methyl group, X is a sulfur atom or an oxygen atom, n is an integer from 0 to 3.

The optical article of a twenty-third invention wherein, in the optical article of the twenty-second invention, M of the complex compound of Formula (I) is one of Nd, Er, and Ho, and the content is 2 to 15 phm based on the polymerizable monomers.

The optical article of a twenty-fourth invention wherein, in the optical article of the twenty-third invention, M of the complex compound of Formula (I) is one of Nd and Er, and the content is 2 to 15 phm based on the polymerizable monomers.

The optical article of a twenty-fifth invention wherein, in the optical article of the twenty-third invention, M of the complex compound of Formula (I) is Nd, Er, and Ho, and the content is 2 to 15 phm each based on the polymerizable monomers.

The Formulae and the present invention are described in detail below.

Specifically, the concept of the plastic material of the present invention comprises the polymer comprising the composition of the following i) with a two-coordination compound of the following ii):

i) a "polymer" obtained by polymerizing at least one polymerizable monomer in the presence of a polymerization initiator or catalyst; and ii) a "two-coordination complex compound" shown in Formula (I)

$(A)_2M(OH)(H_2O)$     (I)

M: Sc, Y, La, Pt, Nd, Pm, Sm, Gd, Dy, Ho, Er, Tm or Lu.

A: A ligand having the structure shown below and forming a chelate complex containing at least one of an aryl group and a heterocyclic ring.

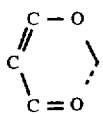

The present invention solves problems specific to the plastic material applied in the international application (PCT/JP92/00883), and the contents of both applications differ in that the complex compound used in the above application is a three-coordination complex compound (hereinafter referred to as "three-coordination complex") shown in Formula (III).

$(A)_3M$     (III)

In contorast the present invention uses a two-coordination complex compound(hereinafter referred to as "two-coordination complex") shown in Formula (I).

Next, differences between the three-coordination complex of the former application and the two-coordination complex of the present invention are described.

When optical articles are produced using the plastic material containing the three-coordination complex, and changes over a long period of time are being checked, problems have been found in (1) solubility in the monomers, (2) stability after dissolving in a solvent, and (3) stability of coloring.

In the course of investigation the causes, of these problems with an eye on clarification of the stereo structure of the coordination of the complex compound, the inventors have found that the problems of the three-coordination complex are due to steric hindrance, and have accomplished the present invention.

However, in the starting stage, synthesis of the complex compound was the only method to obtain the formerly disclosed three-coordination complex, synthesis of the two-coordination complex was not considered, and a practical synthetic method was not known.

Therefore, the inventors have conducted studies for a method of synthesizing a two-coordination complex for the present invention (details are shown in "Synthesis Examples 1–3" described later.).

Differences in the production method between the three-coordination complex and the two-coordination complex and effects thereof are described in (1) to (6) below. (1) In the synthesis method disclosed in the previous application, 3 moles of the ligand A always coordinated with a trivalent metal M, and a two-coordination complex could not be synthesized.

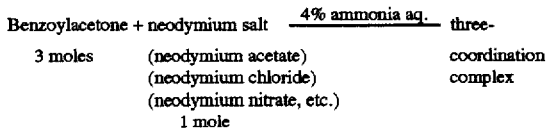

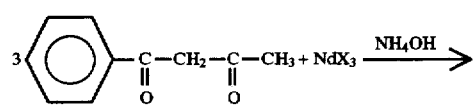

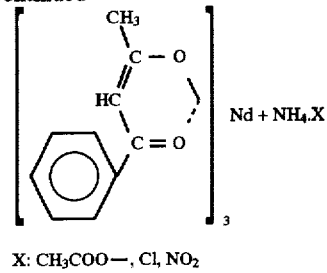

X: CH₃COO—, Cl, NO₂

Therefore, since the presence and synthesis method of a two-coordination complex were unknown when the application on the three-coordination complex was filed, anticipation that the two-coordination complex is superior to the three-coordination complex in solubility and stability was impossible.

The two-coordination complex has been synthesized in the study for solving the problems of the three-coordination complex (solubility and stability), and confirmed to be superior to the three-coordination complex for the first time by the present invention.

(2)Production method of two-coordination complex

To a solution dissolving 2 moles of benzoylacetone and 1 mole of neodymium nitrate in methanol, 4% aqueous ammonia solution is added dropwise, and reacted at 20° to 25° C. for 1 hour. A blue-violet crystal precipitates, which is washed with water and dried.

A detailed synthesis method is as shown in "Synthesis Example 1" described later.

The coordination number of the ligands of the complex, for example, when benzoylacetone is used as A, that is, which is synthesized, the two-coordination complex or the three-coordination complex, depends on the molar ratio (molar ratio charged) when charging benzoylacetone and neodymium nitrate as shown in Table 1 below.

TABLE 1

| Benzoylacetone: Neodymium Nitrate | Synthesized Complex |
|---|---|
| (Two-coordination complex)2: 1 | Aquahydroxy(1-phenyl-1,3-dionato)neodymium complex (1) |
| (Three-coordination complex)3: 1 | TrisBenzoylacetonatoneodymium complex (2) |
| (Single-coordination complex)1: 1 | Diaqua(1-phenyl-1,3-butanedionato) dihydroxyneodymium complex (3) |

(1) $(C_6H_5COCHCOCH_3)_2Nd(OH)(H_2O)$
(2) $(C_6H_5COCHCOCH_3)_2Nd.2H_2O$
(3) $(C_6H_5COCHCOCH_3)Nd(OH)_2(H_2O)$ (3) Next, the analysis method of the two-coordination complex and the three-coordination method will be briefly described. General analysis method of complex includes elementary analysis, metal analysis, water content, infrared absorption spectrum, DSC (Differential Scanning Calorimeter), and the like.

Elementary analysis

A method for detecting an organic compound or ingredient elements (C, H, O) of an organic compound to determine the contents. Percentages of the individual ingredient elements are determined, a molecular formula is derived from the result, and the original compound is identified.

Metal analysis

DSC (differential scanning calorimetry)

The sample and a reference substance are placed in the same conditions while controlling by heating or cooling, and the energy required for maintaining the temperature difference between the two to zero is recorded against time or temperature.

An example of the analytical results of the two-coordination complex, three-coordination complex, and single-coordination complex is shown in Table 2 below.

TABLE 2

| | Two-Coordination Complex Aquahydroxy(1-phenyl-1, 3-butanedionato) neodymium complex | Three-Coordination Complex Trisbenzoyl acetonatoneodymium complex | Single-Coordination Complex Diaqua(1-phenyl-1, 3-butanedionato) dihydroxyneodymium complex |
|---|---|---|---|
| Elementary analysis | | | |
| (Calculated) C | 47.88% | 54.28% | 31.98% |
| H | 4.22 | 4.70 | 4.02 |
| (Measured) C | 47.94 | 54.34 | 31.56 |
| H | 3.90 | 4.58 | 4.30 |
| Metal analysis (Nd) | | | |
| (Calculated) | 28.8 | 21.7 | 40.5 |
| (Measured) | 30.0 | 22.1 | 38.4 |
| Water content | | | |
| (Calculated) | 3.6 | 5.4 | 9.5 |
| (Measured) | 4.1 | 4.58 | 10.7 |
| DSC (Melting point) | 170° C. | 180° C. | 183° C. |
| Infrared absorption spectrum | FIG. 15 | FIG. 17 | — |

TABLE 2-continued

| | Two-Coordination Complex Aquahydroxy(1-phenyl-1, 3-butanedionato) neodymium complex | Three-Coordination Complex Trisbenzoyl acetonatoneodymium complex | Single-Coordination Complex Diaqua(1-phenyl-1, 3-butanedionato) dihydroxyneodymium complex |
|---|---|---|---|
| Visible ultraviolet absorption spectrum (2% toluene solution) | FIG. 16 | FIG. 18 | Insoluble in toluene |

(4) The basis of the chemical stability of the two-coordination complex is be described below.

When the ligand coordinating the metal atom has a bulky structure like benzoylacetone, the three-coordination complex is in an unstable state in view of energy due to a steric hindrance. In this case, in the state where the complex is dissolved in a solvent or monomer, the degree of freedom increases, and it changes to a low entropy state.

Therefore, the three-coordination complex changes to a state which is stable as to energy,that means,it decomposes.

FIG. 19 simulates a structure where a two-coordination complex (aquahydroxy(1-phenyl-1,3-butanedionato) neodymium) is the most stable as to energy.

As shown in FIG. 19, in the two-coordination complex, two units of bulky benzoylacetone coordinate to a metal M (Nd atom) symmetrically with the phenyl groups at the outside, and OH and $H_2O$ coordinate the remaining conformers. The structure of the two-coordination complex is much less affected by steric hindrance compared with the three-coordination complex, and is thus stable in energy.

Therefore, since the two-coordination complex takes a stable state even when dissolved in a solvent or monomer with a high degree of freedom, no decomposition nor change in color takes place.

(5) Stability test

Next, the improved chemical stability when dissolved in a polymerizable monomer is described.

Detailed test examples are described later (Test Examples 1 to 8).

In the present invention, improvement of chemical stability in the state when dissolved in a polymerizable monomer means the following conditions.

(1) No change in color occurs over time.

(2) No precipitation takes place over time by decomposition of the complex.

As a result, (1) the two-coordination complex can always provide the same color, and (2) when the two-coordination complex is dissolved in a monomer, the solution can be stored for a long period of time.

That is, since the raw materials can be previously mixed, limitation of the molding process time can be reduced, and raw materials used for molding for a week can be mixed in a single mass, and efficiency of the work can be improved, leading to a cost reduction.

In the present invention, it is preferable to use the two-coordination complex in a pure state, but a small amount of a three-coordination complex can be present in view of the solubility and stability,as will be described later.

(6) Color stability of the transparent plastic material obtained using the two-coordination complex is shown below An achromatic color such as gray can be obtained using conventional three-coordination complexes depending on the combination of complex compounds.

However, the three-coordination complex has a problem of stability after dissolution in a monomer, that is, a stable achromatic color cannot be obtained due to a change in color time. The material obtained with the two-coordination complex, which is described in the present invention, has a good stability and solves the above problem.

Combinations of two-coordination complexes and resulting colors are shown in Table 3.

TABLE 3

| Ratio of Complex | | | Absorption Wavelength of | Color of |
|---|---|---|---|---|
| BANd | BAEr | BAHo | Molding (lens) | Molding |
| 50 | 50 | — | 510–530 570–590 | Gray |
| 65 | 35 | — | 510–530 570–590 | Blue-violet |
| 35 | 65 | — | 510–530 570–590 | Violet-dark blue |
| 65 | — | 35 | 440–460 570–590 | Blue-green |
| 35 | — | 65 | 440–460 570–590 | Yellow-green |
| — | 50 | 50 | 440–460 570–590 | Green |
| — | 50 | 50 | 440–460 510–530 | Brown |

(7) As described above, differences between the use of the two-coordination complex and the use of the prior art of three-coordination complex are summarized as follows.

1) Solubility Test

The two-coordination complex is readily soluble in monomers, and the three-coordination complex has inferior solubility.

As a result, the content of the two-coordination complex can be greatly increased.

2) Stability Test i) When the two complexes are dissolved individually in a solvent, there are differences in changes over time.

As a result, the two-coordination complex is superior in handling (for example, can be stored for a long time dissolved in a solvent, and can be dealt with when the machine stops accidentally), and in advantageous compared with the three-coordination complex.

ii) There are changes in coloring.

As a result, the two-coordination complex always provides a material of the consistent color.

iii) Combination of the two-coordination complex with the three-coordination complex No considerable difference is noted in changes over time even when a small amount of the three-coordination complex is mixed with the two-coordination complex, but preferably the total amount is the two-coordination complex.

Therefore, even if a small amount of the three-coordination complex is added, the resulting mixture is usable in view of solubility and stability.

Specific examples of the complex compound of Formula (I) of the present invention are shown below:

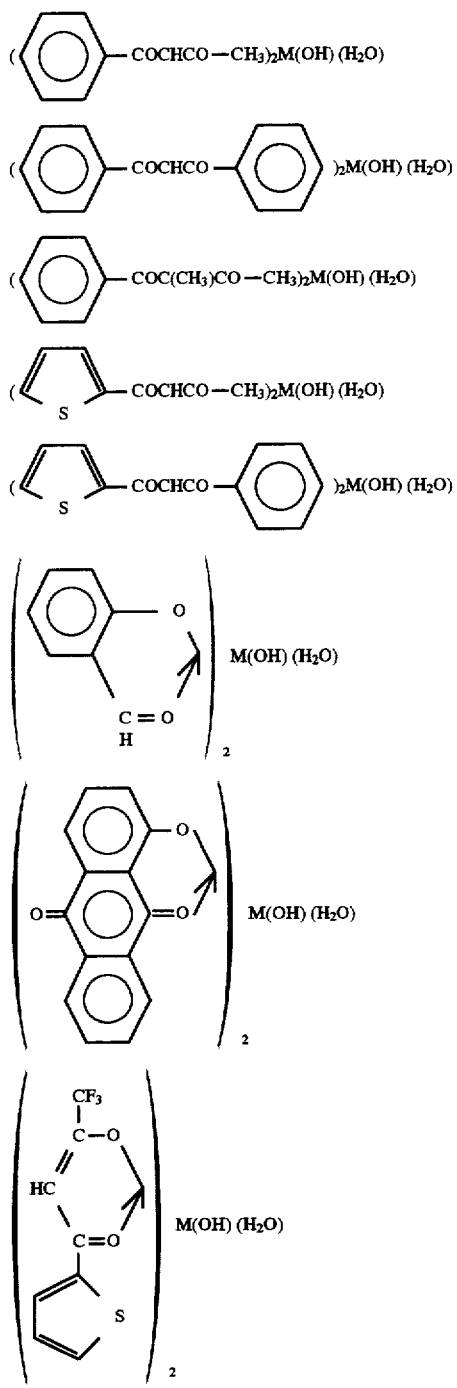

The complex compound of Formula (I-1) is shown below as an example of the complex compound of Formula (I) of the present invention.

In the following chemical structure, when M is Nd the steric structure is as shown in FIG. 19.

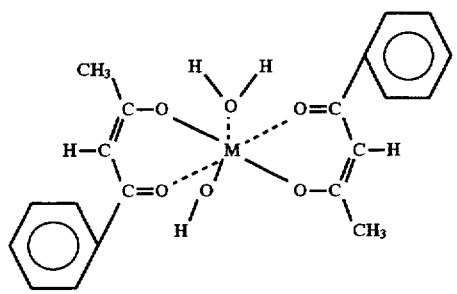

The complex compound of Formula (I) is an essential ingredient to endow the transparent plastic material with a selective absorption function to light of a specific wavelength, and is preferably present in an amount of 0.1 to 20% by weight. If the amount of the complex compound is less than 0.1% by weight, the above effect is low, and if it exceeds 20% by weight, the physical characteristics of the resulting plastic material tend to be deteriorated, which is not preferable.

Further, the complex compound differs in the wavelength of sharp absorption depending on the type of rare earth element M, and the transparent plastic material containing the complex compound and optical articles comprising the same have properties to selectively block or reduce only light of specific wavelengths. The transparent plastic material containing the complex compound and optical articles comprising the same have properties to selectively block or reduce only light of wavelengths which largely affect the human eye, and properties to selectively block or reduce only light of wavelengths which are dazzling to the human eye. When M is Nd (neodymium), the material has a sharp absorption in the vicinity of 570 to 590 nm and, when M is Pm (promethium), it has a sharp absorption in the vicinity of 560 to 580 nm, which agrees with the wavelength range of high specific luminosity factor in light adaptation sight, therefore they provide the transparent plastic material with a glare-proof function. Er (erbium) gives a sharp absorption in the vicinity of 510 to 530 nm, and Ho (holmium) gives a sharp absorption in the vicinity of 440 to 460 nm, which provides endow the material with a glare-proof function in dark adaptation sight. Therefore, since the wavelength range of selective absorption differs depending on the type of rare earth element in the complex compound, it can be selectively utilized according to the purpose of application. Further, it is also possible to use a plurality of complex compounds with different absorption wavelength ranges in order to enhance the glare-proof function. Since the complex compound of the present invention contains an aromatic ring or a heterocyclic ring in the ligand as shown in the above Formula (1-1)~(1-7), ultraviolet light of less than 400 nm in wavelength is absorbed. Therefore, the transparent plastic material containing the complex compound and optical articles comprising the same have properties to block ultra-violet light which is harmful to the human eye. This is effective for preventing cataracts, prevention of electrical ultraviolet light in a skiing ground, and prevention of adverse effects of ultraviolet light on sugi pollinosis (allergic conjunctivitis), particularly suitable for use in optical articles for sight correction such as eyeglass lenses and contact lenses. Therefore, the transparent plastic material of the present invention is not required to be combined with ultraviolet absorbers which are generally used, or it is possible to reduce the amounts of such additives.

The complex compound of Formula (I) used in the present invention is hydrophobic lipophilic, and thus has better compatibility with typical polymerizable monomers forming the transparent plastic material compared with conventional rare earth compounds. In particular, it has superior compatibility with hydrophobic polymerizable monomers. Further, when the complex compound is dissolved in a polymerizable monomer, it is tinted a color specific to the individual rare earth element, it does not discolor over time under irradiation with light of a fluorescent lamp or the like at room temperature, it does not cause precipitation, and it exhibits good chemical stability.

Further, the polymer containing the complex compound has a high transparency and superior selective absorptivity to light of a specific wavelength due to a rare earth element, and absorbs harmful ultraviolet light, without variation in tint and occurrence of precipitation. The polymer, since the complex compound of Formula (I) has good compatibility with hydrophobic polymerizable monomers, can have an improved water resistance without using a water-soluble metal salt and a hydrophilic polymerizable monomer, the dimensional stability is improved since there is no problem of increasing water absorptivity, and there is no problem of cracking when a deposition film is provided on the surface of the polymer. Further, since the complex compound of Formula (I) has an ultraviolet absorbing function, it is not required to add an ultraviolet absorber separately, and even if an ultraviolet absorber is to be added, the amount can be reduced to a very small quantity, which can solve the problem of compatibility such as precipitation of the ultraviolet absorber, and prevent deterioration of mechanical characteristics of the polymer.

Of the above-described complex compounds of Formula (I), those of Formulae (1-1-a) to (1-4-d) have particularly good compatibility with polymerizable monomers.

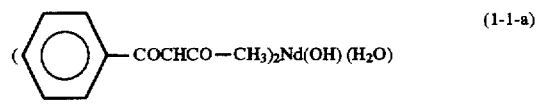

(1-1-a)

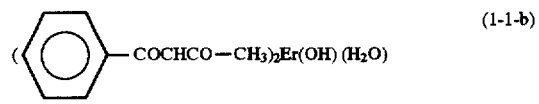

(1-1-b)

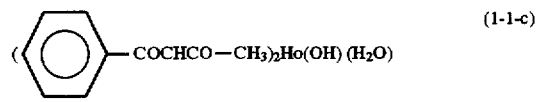

(1-1-c)

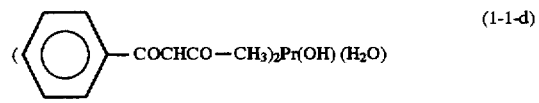

(1-1-d)

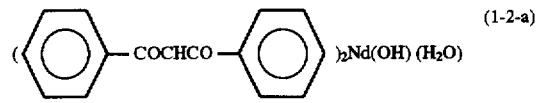

(1-2-a)

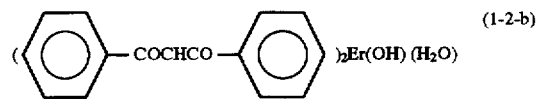

(1-2-b)

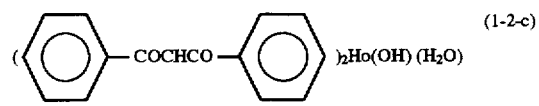

(1-2-c)

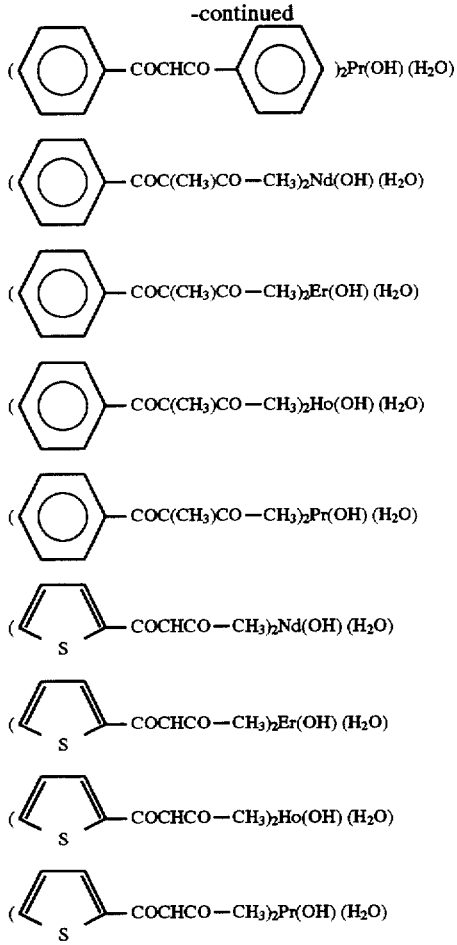

Of the above complex compounds, use of the following compounds is particularly preferable.

Aquahydroxy(1-phenyl-1,3-butanedionato)neodymium (1-1-a)

Aquahydroxy(1-phenyl-1,3-butanedionato)erbium (1-1-b)

Aquahydroxy(1-phenyl-1,3-butanedionato)holmium (1-1-c)

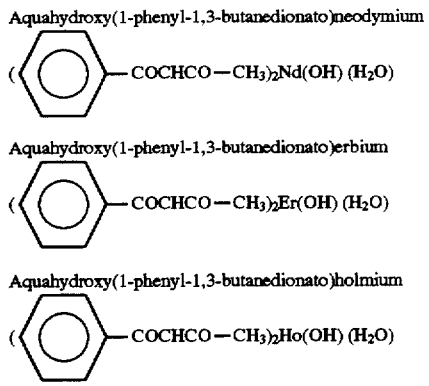

The content of the above two-coordination complex compound in the polymerizable monomer is 1 to 20 phm, more preferably 2 to 15 phm.

If the content is less than I phm, the resulting optical articles do not have any glare-proof effect, and even if the content exceeds 20 phm, further addition is unnecessary since 100% of a specific wavelength is cut off.

If the amount is within the above content, using two-coordination complex compounds containing, for example, Nd, Er, and Ho as rare earth elements in appropriate amounts, the molding can be endowed with a desired color.

The two-coordination complex compound of Formula (I) is synthesized by the following method. Specifically, 1 mole of rare earth metal nitrate and 2 mole of 1,3-diketone are dissolved in methanol. 4% aqueous ammonia solution is added dropwise, reacted at 20° to 25° C. after the dropping, the precipitated crystal is filtered, and washed with water to obtain the complex compound of Formula (I).

The polymerizable monomer in the present invention means a compound which can produce polymers, and the formation reaction of the polymer includes radical polymerization, ionic polymerization, coordination polymerization, ring-opening polymerization, polyaddition, polycondensation, addition condensation, and the like.

The polymerizable monomer in the present invention can be radical polymerizable compounds which are generally used, having at least one unsaturated hydrocarabon group such as vinyl group, allyl group, acryl or methacryl group, vinylidene group, vinylene group, or the like in the molecule. Specifically, they include styrene derivatives such as styrene, methylstyrene, dimethylstyrene, chlorostyrene, dichlorostyrene, bromostyrene, p-chloromethylstyrene, and divinylbenzene; monofunctional acrylic esters such as acrylic acid, methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, 2-acryloyloxyethyl succinic acid, and 2-acryloyloxyethyl phthalic acid,caprolactone acrylate,glycidyl acrylate: monofunctional methacrylic esters such as methacrylic acid, methyl methacrylate ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl inethacrylate, 2-hydroxyethyl methacrylate, 2-hydroxypropyl methacrylate, 2-hydroxybutyl methacrylate, and glycerol methacrylate, 2-methacryloyloxyethyl succinic acid, 2-methacryloyloxyethyl phthalic acid, caprolactone methacrylate, glycidyl methacrylate; allyl compounds such as allylbenzene, allyl-3-cyclohexane propionate, 1-allyl-3,4-dimethoxybenzene, allylphenoxy acetate, allylphenyl acetate, allylcyclohexane, and allyl polycarboxylate; fumaric acid, maleic acid, itaconic acid, and their esters, acrylonitrile, methacrylonitrile, maleic anhydride, N-substituted maleimide, and cyclic olefins.

Furthermore, in order to enhance the degree of cross-linking, multifunctional monomers such as ethyleneglycol diacrylate, diethyleneglycol diacrylate, triethyleneglycol diacrylate, tetraethyleneglycol diacrylate, polyethyleneglycol diacrylate, allyl acrylate, bis(acryloxyethyl) hydroxyethyl isocyanurate, bis(acryloxyneopentylglycol) adipate, 1,3-butyleneglycol diacrylate, 1,6-hexanediol diacrylate, neopentylglycol diacrylate, propyleneglycol diacrylate, polypropyleneglycol diacrylate, 2-hydroxy-1,3-diacryloxypropane, 2,2-bis[4-(acroyloxy)phenyl]propane, 2,2-bis[4-(acroyloxyethoxy)phenyl]propane, 2,2-bis[4-(acryloxyethoxy-diethoxy)phenyl]propane, 2,2-bis[4-(acryloxyethoxy-polyethoxy)phenyl]propane, neopentylglycoldiacrylate hydroxypivalate, 1,4-butanediol diacrylate, dicyclopentanyldiacrylate, dipentaerythritol hexaacrylate, dipentaerythritolmonohydroxypentaacrylate, di-trimethylpropane tetraacrylate, pentaerythritol triacrylate, tetrabromobisphenol A diacrylate, triglycerol diacrylate, trimethylpropane triacrylate, tris(acryloxyethyl)isocyanurate, ethyleneglycol dimethacrylate, diethyleneglycol dimethacrylate, triethyleneglycol dimethacrylate, tetraethyleneglycol dimethacrylate, polyethyleneglycol dimethacrylate, propyleneglycol dimethacrylate, polypropyleneglycol dimethacrylate, 1,3-butyleneglycol dimethacrylate, 1,4-butanediol dimethacrylate, 1,6-hexanediol dimethacrylate, neopentylglycol dimethacrylate, 2-hydroxy-1,3-dimethacryloxypropane, 2,2-bis[4-(methacryloxy)phenyl]propane, 2,2-bis[4-(methacryloxyethoxy-ethoxy)phenyl]propane, 2,2-bis[4-(methacryloxyethoxy-diethoxy)phenyl]propane, 2,2-bis[4-(methacyloxyethoxy-polyethoxy)phenyl]propane, tetrabromobisphenol A dimethacrylate, dicyclopentanyl dimethacrylate, dipentaerythritol hexamethacrylate, glycerol dimethacrylate, neopentylglycoldimethacrylate hydroxypivalate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylpropane trimethacrylate, tris(methacryloxyethyl) isocyanurate, allylmethacrylate, divinylbenzene, diallylphthalate, diallylterephthalate, diallylisophthalate, and diethyleneglycol bisallylcarbonate can be used. However, when unsaturated carboxylic acids such as methacrylic acid, acrylic acid, 2-hydroxyethyl methacrylate, 2-hydroxyethyl acrylate, 2-hydroxylpropyl methacrylate, 2-hydroxypropyl acrylate, 2-acryloyloxyethyl succinic acid, 2-methacryloyloxyethyl succinic acid, 2-acryloyloxyethyl phthalic acid, 2-methacryloyloxyethyl phthalic acid, glycidyl acrylate, glycidyl methacrylate,glycerol methacrylate, fumaric acid, maleic acid, and itaconic acid; or hydrophilic polymerizable monomers such as diethyleneglycol diacrylate, diethyleneglycol dimethacrylate, triethyleneglycol diacrylate, triethyleneglycol dimethacrylate, polyethyleneglycol diacrylate, polyethyleneglycol dimethacrylate, polypropyleneglycol diacrylate, polypropyleneglycol dimethacrylate, and glycerol dimethacrylate are used, it is required to use these monomers only in amounts having no effects on the water absorption properties of the resulting polymer.

The amount of the complex compound of Formula (I) to be dissolved in these polymerizable monomers may vary. Therefore, the amount of the complex compound added must be appropriately determined within the range where deterioration in mechanical strength of the resulting plastic material is very small, transparency is maintained, and properties to block or reduce light of a specific wavelength due to the selective absorptivity of the specific wavelength are achieved.

These polymerizable monomers may be used alone or as combinations of two or more types. Furthermore, they may be used in combination with oligomers or macromers such as those of polyester (meth)acrylate, urethane (meth) acrylate, and epoxy (meth)acrylate.

The polymer of the present invention comprising these polymerizable monomers can be obtained by thermal polymerization or photopolymerization by ultraviolet light, electromagnetic wave polymerization using electronic wave, or radiation polymerization using radiation.

As a thermal polymerization initiator, peroxy esters such as t-butylperoxyneodecanoate, t-butylperoxypivalate, t-butylperoxyisobutyrate, t-butylperoxyacetate, cumylperoxyneodecanoate, t-butylperoxyoctoate, t-butylperoxyisopropylcarbonate, cumylperoxyoc toate, t-hexylperoxyneodecanoate, t-hexylperoxypivalate, t-butylperoxyneohexanoate; peroxyketals such as 1,1-bis(t-butylperoxy)3,3,5-trimethylcyclohexane, 1,1-bis(t-butylperoxy)cyclohexane, 2,2-bis(t-butylperoxy)octane, 2,2-bis(t-butylperoxy)butane; diacrylperoxides such as acetylperoxide, isobutylylperoxide, octanoylperoxide, lauroylperoxide, benzoylperoxide, and m-toluoylperoxide; organic peroxide initiators such as diisopropylperoxy dicarbonate, and di-n-propylperoxy dicarbonate; azo compound initiators such as 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), dimethyl-2,2'-azobisisobutyrate, and 2,2'-azobis(2,4,4-trimethylpentane); or redox type initiators can be used, preferably in an amount of 0.01 to 5% by weight. As a photopolymerization initiator, acetophenone type initiators such as diethoxyacetophenone, 2-hydroxy-2-methyl-1-phenylpropan-1-one, 1-oxy(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl-(2-hydroxy-2-propyl)ketone, and 1-hydroxycyclohexylphenylketone; benzoin type initiators such as benzoin, benzoinmethylether, benzoinethylether, benzoinisopropyl ether, benzoinisobutyl ether, and benzyldimethylketal; benzophenone type initiators such as benzophenone, benzoylbenzoic acid, methyl benzoylbenzoate, 4-phenylbenzophenone, and hydroxybenzophenone; or acrylphosphineoxide type initiators such as 2,4,6-trimethylbenzoyldiphenylphosphineoxide, 2,6-dimethylbenzoyldiphenylphosphineoxide, and benzoyldiethoxyphosphineoxide can be used, preferably in an amount of 0.001 to 5% by weight. Further, dicarbonyl type initiators such as benzil, camphor-quinone, anthraquinone, and acenaphthene: thioxanson type initiators such as 2-methylthioxanson, and 2,4-diethylthixanson; or acylphosphineoxide type initiators initiators such as 2,4,6-trimethylbenzoyldiphenylphosphineoxide, 2,6-dimethylbenzoyldiphenylphospbeneoxide, and benzoyldiethoxyphosphineoxide can also be used as visible light curing photopolymerization intiators, preferably in an amount of 0.001 to 5% by weight. Still further, the thermal polymerization initiators and the photopolymerization initiators can also be used in combination.

The mixture comprising the complex compound of Formula (I), the above polymerizable monomer, and the polymerization initiator can be mixed, as necessary, with small amounts of a thermal stabilizer, an antioxidant, a photostabilizer, a release agent, a chain transfer agent, a polymerization controller, and the like.

Plastic materials which have good compatibility with the complex compound of Formula (I) and can provide highly transparent plastic materials include a styrene based transparent plastic material, an isocyanurate type transparent plastic material, a urethane (meth)acrylate type transparent plastic material, a polyester (meth)acrylate type transparent plastic material, and a sulfur-containing (meth)acrylate type transparent plastic material.

Here, the styrene type transparent plastic material means a polymer mainly comprising styrene and/or a styrene derivative, for example, a polymer mainly comprising styrene or styrene derivative obtained by polymerizing a mixture of at least one polymerizable monomer of styrene or a styrene derivative of Formula (2-1), at least one polymerizable monomer of Formula (2-2), and as necessary, at least one radical polymerizable monomer.

The isocyanurate type transparent plastic material means a polymer mainly comprising an isocyanurate derivative having a triazine skeleton and a radical polymerizing group in the molecule, for example, a polymer mainly comprising an isocyanurate derivative obtained by polymerizing a mixture of a trifunctional polymerizable monomer of Formula (2-3) having a triazine skeleton and a radical polymerizing group in the molecule and a polymerizable monomer which can copolymerize with the above component.

The urethane (meth)acrylate type transparent plastic material means a polymer mainly comprising ; urethane (meth)acrylate obtained by reacting an isocyanurate group containing compound with a hydroxy group containing compound, for example, a polymer mainly comprising a urethane (meth)acrylate obtained by polymerizing a mixture of a urethane (meth)acrylate obtained by reacting a compound of Formula (2-4) with a hydroxy group containing compound, and a radical polymerizable monomer or oligomer.

The polyester (meth)acrylate type transparent plastic material means a polymer mainly comprising a polyester (meth)acrylate having a polyester structure in the molecule, for example, a polymer mainly comprising a polyester (meth)acrylate obtained by polymerizing a mixture of at least one polymerizable monomer of Formula (2-5) and a radical polymerizable monomer or oligomer, or a polymer mainly comprising a polyester (meth)acrylate of Formula (2-6) obtained by polymerizing a mixture of a compound of Formula (2-6) and ethyleneglycol dimethacrylate compound and an aromatic vinyl compound.

The sulfur containing (meth)acrylate type transparent plastic material means a polymer mainly comprising a (meth)acrylate containing a sulfur atom in the molecule, for example, a polymer mainly comprising a sulfur containing (meth)acrylate obtained by polymerizing a mixture of a thiol (meth)acrylate of Formula (2-8) and a radical polymerizable monomer.

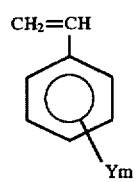

(2-1)

Y denotes a halogen other than fluorine or hydrogen, m is 1 or 2.

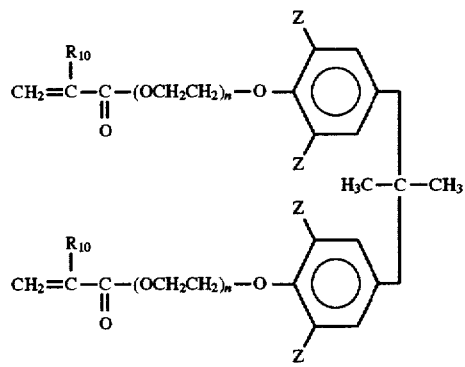

(2-2)

Z denotes a halogen other than fluorine, $R_{10}$ denotes hydrogen or a methyl group, and n is 0 to 3.

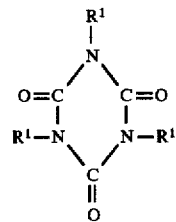

(2-3)

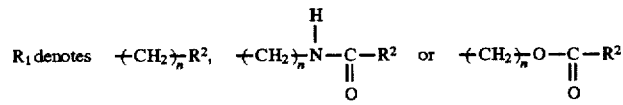

(n is an integer from 2 to 8, and $R_2$ is $-O+CH_2CH_2O\frac{}{m}CH_2CH=CH_2$,

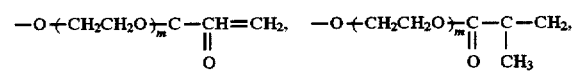

radical polymerizable functional group wherein m is an integer from 0 to 2.

-continued

R denotes H or CH₃.

(2-4)

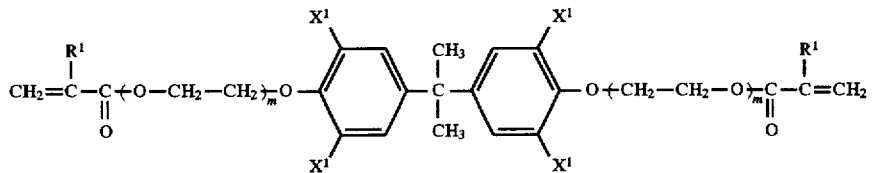

(2-5)

wherein $R^1$ is hydrogen or a $C_1$–$C_2$ alkyl group of, $X^1$ is hydrogen or a halogen other than fluorine, m is an integer from 0 to 4. R1, X1 and m, which exist in a plurality and may be the same or different.

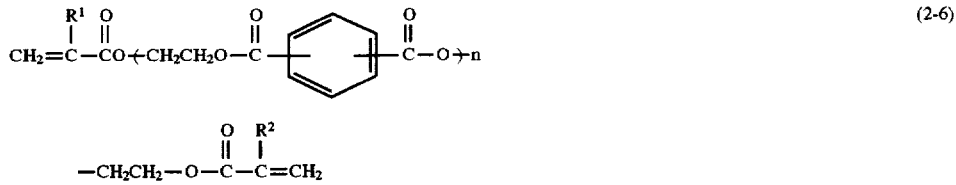

(2-6)

(wherein n is 1 to 6, $R^1$ and $R^2$ indicate hydrogen or a methyl group respectively.)

(2-7)

(wherein, m is 1 to 8.)

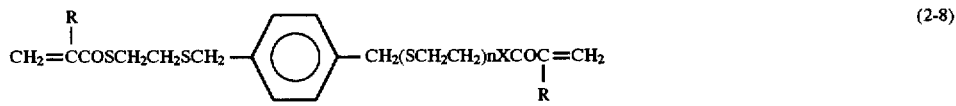

(2-8)

wherein R denotes hydrogen or a methyl group, X denotes a sulfur atom or a oxygen atom, and n is an integer from 0 to 3.

As the polymerizable monomer in the present invention, a polyaddition polymerizable compound can be used. A polyaddition reactive group means a group which is possible to undergo addition reaction, and typical examples thereof include an isocyanate group (—NCO), an isothiocyanate group (—NCS), and groups reactable with the reactive group include a hydroxy group, an amino group, a inercapto group, and a carboxyl group. That is, the polymerizable monomer which can form a polymer in the present invention comprises a compound having at least two isocyanate or isothiocyanate groups in the molecule as shown in the following Formulae (4-a) to (4-b), and a compound having either of at least two hydroxy groups, amino groups, mercapto groups, or carboxyl groups as shown in Formulae (4-c) to (4-f), wherein m, m' indicate an integer of 2 or more.

| | |
|---|---|
| R-(NCO) m | (4-a) |
| R-(NCS) m | (4-b) |
| R'-(OH) m' | (4-c) |
| R'-(NH2) m' | (4-d) |
| R'-(SH) m' | (4-e) |
| R'-(COOH) m' | (4-f) |

Here, typical examples of isocyanate reactions are shown in Formulae (5-1), (5-2), (6-1) to (6-6).

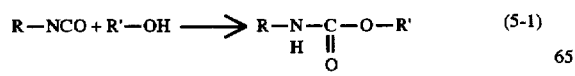

(5-1)

-continued

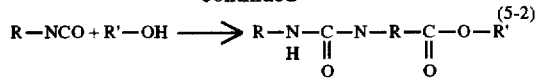

(5-2)

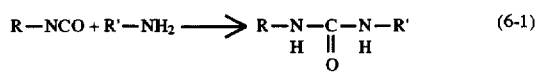

(6-1)

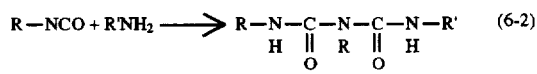

(6-2)

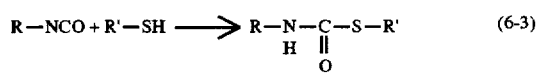

(6-3)

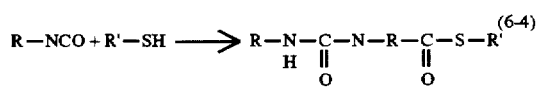

(6-4)

(6-5)

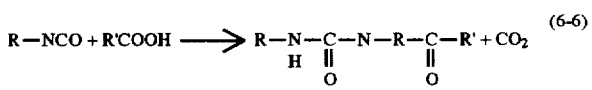

(6-6)

Further, typical examples of isothiocyanate reactions are shown in Formulae (7-1) to (7-8).

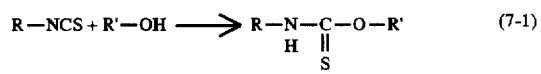

(7-1)

-continued

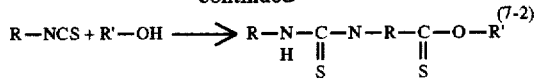 (7-2)

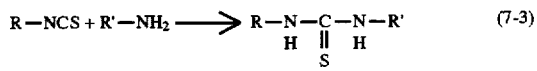 (7-3)

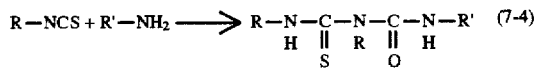 (7-4)

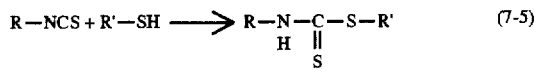 (7-5)

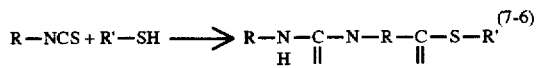 (7-6)

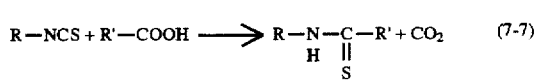 (7-7)

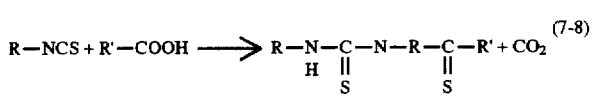 (7-8)

Specific examples of the compound of Formula (4-a) include hexamethylene diisocyanate, 2,4,4-trimethylhexamethylene diisocyanate, 1,3,6-hexamethylene triisocyanate, xylylene diisocyanate, isophorone diisocyanate, dicyclohexylmethane diisocyanate, cyclohexane diisocyanate, tolylene diisocyanate, toluidine diisocyanate, 4,4'-diphenylmethane diisocyanate, thiodiethyl diisocyanate, thiodipropyl diisocyanate, diphenylsulfide-2,4'-diisocyanate, and 2,2'-dimethyldiphenyldisulfide-5,5'-diisocyanate. Practical examples of the compound of Formula (4-b) include 1,2-diisothiocynateethane, 1,3-diisothiocynatepropane, 1,2-diisothiocyanatebenzene, and 1,1'-methylenebis(4-isothiocyanate-3-methylbenzene).

Further, examples of the compound of Formulae (4-c) to (4-f) include polyetherpolyol, polytetramethyleneetherglycol, alkyleneoxide copolymerized polyol, epoxy resin modified polyol, lactone type polyesterpolyol, condensation type polyesterpolyol, polycarbonatediol, acrylic polyol, polybutadienepolyol, phosphorus-containing polyol, halogen-containing polyol, polyetherpolyamine, polytetramethyleneetherdiamine, alkyleneoxide-copolymerized polyamine, epoxy resin modified polyamine, condensation type polyesterpolyamine, polycarbonatediamine, acrylic polyamine, polybutadienepolyamine, phosphorus-containing polyamine, halogen-containing polyamine, polyetherpolyol, polytetramethyleneetherdithiol, alkyleneoxide-copolymerized polythiol, epoxy resin modified polythiol, lactone type polyesterpolythiol, condensation type polyester polythiol, polycarbonatedithiol, acrylic polythiol, polybutadienepolythiol, phosphorus-containing polythiol, halogen-containing polythiol, and the like. In these compounds, it is preferable to determine the molecular structure of the basic skeleton in order to obtain properties depending on the use of the resulting polymer. The polymer of the present invention can be obtained by a polyaddition reaction. That is, in general, under the presence of a polymerization catalyst, a polymerizable monomer of Formulae (4-a) to (4-b) and a polymerizable monomer of Formulae (4-c) to (4-f) are mixed, and heated to obtain a polymer. As the polymerization catalyst, amine catalysts including monoamines such as triethylainine, and N,N-dimethylcyclohexylamine; diamines such as N,N,N',N'-tetramethylethylenediamine, N,N,N',N'-tetramethylpropane-1,3-diamine; triamines such as N,N,N',N'-pentamethyldiethylenetriamine, N,N,N',N'-pentamethyldipropylenetriamine, and tetramethylguanidine; cyclic amines such as triethylenediamine, N,N'-dimethylpiperazine, N-methyl-N'-(2-dimethylamino)ethylpiperazine, N-methylmonopholine, N-(N',N'-dimethylaminoethyl)morpholine, and 1,2-dimethylimidazole; alcoholamines such as dimethylaminoethanol, dimethylaminoethoxyethanol, N,N,N'-trimethylaminoethylethanolamine, N-methyl-N'-(2-hydroxyethyl)piperazine, N-(2-hydroxyethyl)monopholine; etheramines such as bis(2-dimethylaminoethyl)ether, ethyleneglycolbis(3-dimethyl)aminopropylether; and organic metal catalysts such as dibutyltindilaurate, dibutyltindiacetate, dibutyltinmercaptide, dibutyltinthiocarboxylate, dibutyltindimaleate, dioctyltinmercaptide, dioctyltinthiocarboxylate, phenylinercurypropionic acid salt, and lead octenate. These polymerization catalysts can be used alone or in combination of two or more types.

The amount of the complex compound of Formula (I) to be dissolved in these polymerizable monomers may vary, but must be appropriately determined within the range where the transparency is maintained, and the properties to block or reduce light of a specific wavelength due to the selective absorptivity of the specific wavelength are achieved. Further, the mixture of the complex compound of Formula (I), the polyaddition polymerizable monomer, and the polymerization catalyst can be mixed, as necessary, with a substance such as an optical stabilizer, an ultraviolet absorber, an antioxidant, or an internal release agent.

Of the above-described polyaddition polymerizable monomers, those which have good compatibility with the complex compound of Formula (I), and can provide a transparent plastic material which has high transparency and a relatively high refractive index (1.60 to 1.75) include a sulfur-containing urethane resin type transparent plastic material obtained by reacting a mercapto compound of Formula (8) and at least one ester compound selected from the group consisting of a polyiocyanate compound, a polyisothiocyanate compound, and an isothiocyanate compound having an isocyanate group in the presence of a polymerization catalyst, as disclosed in Japanese OPI 02-270859/1990.

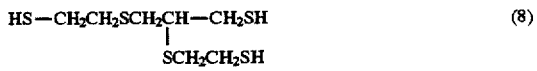 (8)

Still further, as a polymerizable monomer in the present invention, a polycondensation polymerizable compound can be used. A polycondensation reactive group is a functional group which can undergo condensation reaction, including a carboxyl group (—COOH), a hydroxy group (OH), an amino group (NH3), an alkoxy group (—OR; where R is an alkyl group), and the like. That is, a polymerizable monomer which can produce a polymer comprises a compound having at least two carboxyl groups in the molecule as shown in Formula (9-a), and a compound having at least two hydroxyl groups, amino groups, or alkoxy groups in the molecule as shown in Formulae (9-b), (9-c), (9-d) and the like. In the Formulae, m and m' are integers of 2 or more.

 (9-a)

 (9-b)

R'—(NH2)m'  (9-c)

R'—(OR)m'  (9-d)

R'—(COOR)m  (9-e)

Examples of typical polycondesation reaction are shown in Formulae (10-a) to (10-d).

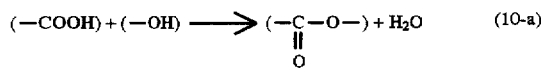

(—COOH)+(—OH) ⟶ (—C(=O)—O—) + H$_2$O  (10-a)

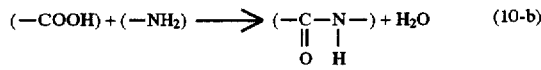

(—COOH)+(—NH$_2$) ⟶ (—C(=O)—N(H)—) + H$_2$O  (10-b)

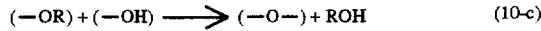

(—OR)+(—OH) ⟶ (—O—)+ROH  (10-c)

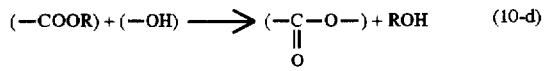

(—COOR)+(—OH) ⟶ (—C(=O)—O—)+ROH  (10-d)

The compound of Formula (9-a) specifically includes dicarboxylic acids such as terephthalic acid, adipic acid, and the like. The compound of Formula (9-b) specifically includes diols such as ethyleneglycol, propyleneglycol, and the like. The compound of Formula (9-c) specifically includes diamines such as hexamethylenediainine and the like. The compound of Formula (9-d) specifically includes silane compounds such as 3-glycidoxypropyltrimethoxysilane, 3-methacryloxydipropyltrimethoxysilane, and the like. The compound of Formula (9-e) specifically includes dicarboxylic acid diesters such as dimethyl terephthalate and the like. The polymer of the present invention is generally obtained by heating or heating in the presence of a catalyst.

The amount of the complex compound of Formula (I) to be dissolved in these polymerizable monomers is may vary, but must be appropriately determined within the range where the transparency is maintained, and the properties to block or reduce light of a specific wavelength due to the selective absorptivity of the specific wavelength are achieved. Further, the mixture of the complex compound of Formula (I), the polycondensation polymerizable monomer, and the polymerization catalyst can be mixed, as necessary, with a substance such as an optical stabilizer, an ultraviolet absorber, an antioxidant, or an internal release agent.

The polymer in the present invention indicates a compound produced by a polymerization reaction such as radical polymerization, ionic polymerization, coordination polymerization, ring-opening polymerization, polyaddition polycondensation, and the like.

Since the two-coordination complex compound of Formula (I) used in the present invention is lipophilic, it has superior compatibility with thermoplastic polymers as compared with conventional rare earth compounds. Polymers (thermoplastic resins) with transparency and thermoplasticity include polymethylmethacrylate, polycarbonate, polystyrene, polyvinylchloride, MS resin (styrene-methylmethacrylate copolymer), AS resin (acrylonitrile-styrene copolymer), polycyclohexylmethacrylate, poly-4-methylpentene-1, amorphous polyamide, amorphous polyolefin, transparent fluororesin, fluorinated polyimide, transparent polybutyleneterephthalate, polyacrylate, polysulfone, polyethersulfone, and the like. The transparent plastic material comprising the above polymers can be obtained by mixing the molten polymer with the complex compound of Formula (I), followed by solidification.

The transparent plastic material of the present invention can be used in optical articles including optical apparatus lenses and filters such as eyeglass lenses, contact lenses, intraocular lenses, sunglasses, display filter covers, lighting apparatus covers, automotive mirrors, and the like. Further, the material can also be used as a hard coat for eyeglass lenses and optical apparatus lenses.

The optical articles comprising the transparent plastic material of the present invention can be obtained by cast molding a composition comprising one or more polymerizable monomers, a polymerization initiator or catalyst, and the complex compound of Formula (I) used in the present invention. Specifically, in eyeglass lenses, a mixture comprising one or more polymerizable monomers, a polymerization initiator or catalyst, and the complex compound of Formula (I) used in the present invention is injected into a mold comprising a glass-made mold and a gasket of a soft resin such as ethylene-vinyl acetate copolymer to be cast molded (cast polymerized) to obtain eyeglass lenses comprising the transparent plastic material of the present invention. Similarly, optical articles such as contact lenses, intraocular lenses, sunglasses, display filters, and optical apparatus lenses can also be obtained by cast molding.

Alternatively, the optical articles comprising the transparent plastic material of the present invention can be obtained by a method in which a polymer obtained by polymerizing a composition comprising one or more polymerizable monomers and a polymerization initiator or catalyst is melted, mixed with the complex compound of Formula (I) to be dissolved and solidified to obtain a pellet, the pellet is re-melted using a molding machine such as an injection molding machine, and solidified in a mold. Further, the optical articles comprising the transparent plastic material of the present invention can also be obtained by mixing a polymer obtained by polymerizing a composition comprising one or more polymerizable monomers and a polymerization initiator or catalyst with the complex compound of Formula (I) used in the present invention in a molding machine such as an injection molding machine, and solidifying in a mold. Still further, the optical articles comprising the transparent plastic material of the present invention can also be obtained by melting a polymer obtained by polymerizing a mixture comprising one or more polymerizable monomers, a polymerization initiator or catalyst, and the complex compound of Formula (I) used in the present invention using a molding machine such as an injection molding machine, and solidifying in a mold. Specifically, optical articles such as display filter covers, lighting apparatus covers, automotive mirrors, sunglasses, and optical apparatus lenses and filters such as for cameras can be obtained by the above method.

The optical articles comprising the transparent plastic material of the present invention can be obtained by forming a thin film layer of a polymer obtained by polymerizing a composition comprising one or more polymerizable monomers, a polymerization initiator or catalyst, and the complex compound of Formula (I) used in the present invention on a substrate comprising a transparent plastic material. Specifically, the optical articles such as eyeglass lenses, sunglasses, display filter covers, lighting apparatus covers, automotive mirrors, optical apparatus lenses and filters for cameras, and the like can be obtained by the above method.

Here farsighted eyeglass lenses indicate single focus convex lenses, double focus lenses, progressive multiple focus lenses, and the like. As to farsighted eyeglass lenses of the present invention, single focus convex lenses can be obtained by the above cast molding. Progressive multiple focus lenses can be obtained by injecting a mixture comprising one or more polymerizable monomers and a polymerization initiator or catalyst with the complex compound of Formula (I) used in the present invention in a mold formed of two glass molds for progressive multiple focus lens and a gasket comprising a flexible resin such as ethylene-vinyl acetate copolymer to be cast molded (cast polymerized).

Since contact lenses are medical supplies contacting directly with the cornea, it is preferable to use a substance which is readily soluble in the polymerizable monomer as is the complex compound used in the present invention. Further, as the polymerizable monomer, use of an acrylic ester or a methacrylic ester is particularly preferable. For contact lenses, it is preferable that the polymerizable monomer is injected in a glass tube or a polypropylene or polytetrafluoroethylene tube or a sheet-formed gap and polymerized by heating, or photopolymerized by irradiation with ultraviolet light. If a deflection occurs in the polymer due to polymerization shrinkage or polymerization heat after polymerization, it can be eliminated by heat annealing.

ACTION

Eyeglass lenses comprising the transparent plastic material of the present invention have properties to selectively block or reduce light of a wavelength largely affecting the human eye, and selectively block or reduce only light of a wavelength which is dazzling to the human eye. For example, the complex compound of Formula (I) used in the present invention has a sharp absorption in the vicinity of 570 to 590 nm when M is neodymium and 560 to 580 nm when M is prometium, which is in line with the wavelength range of relatively high sensitivity in light adaptation sight, and provides eyeglass lenses of the present invention with glare-proof properties in light adaptation sight. For erbium and horonium, a sharp absorption is in the vicinity of 510 to 530 nm, 440 to 460 nm, which provides glare-proof properties in the dark adaptation sight. Therefore, since the wavelength of selective absorption differs depending on the type of rare earth element in the complex compound, it is possible to select a suitable type according to the application. Further, it is possible to enhance the glare-proof function by using a plurality of complex compounds with different absorption wavelength ranges. Since, in the compound used in the present invention, the ligand contains an aromatic ring or a heterocyclic ring, it can absorb ultraviolet light of less than 400 nm in wavelength. Therefore, since it has a function to block ultraviolet light which is harmful to the human eye, it is effective to prevent occurrence of cataracts, prevent electrical ophthalmia generated by a welding light or exposure to strong ultraviolet light in a skiing area, and prevention of adverse effects of ultraviolet light on sugi pollinosis (allergic conjunctivitis). Further as for, environmental factors of eye fatigue include light from a television and displays, and other strong light, in particular, light of a wavelength range of high sight sensitivity and ultraviolet light, eyeglass lenses comprising the transparent plastic material of the present invention can block or reduce such strong light and also block ultraviolet light, and eye fatigue can be reduced or prevented. Contact lenses and display filters comprising the transparent plastic material of the present invention have similar functions.

When the transparent plastic material of the present invention is used in farsighted eyeglass lenses, asthenopia can be prevented. Adjustment ability of human eyes is decreased with age, and becomes difficult to see near objects and likely to feel fatigue. This phenomenon which is generally called farsightedness is said to be caused by a decrease in elasticity of the eye lens and a decrease in adjustment function with age. Farsighted eyeglass lenses are used to eliminate thus inconvenience due to farsightedness. Single focus convex lenses have heretofore been used as farsighted eyeglass lenses, but recently, double focus or progressive multiple focus lenses are widely used to eliminate troublesome change of glasses. By using such farsighted eyeglass lenses, the adjustment function of eyes tends to be made up and eye fatigue is reduced. However, there is eye fatigue of types which cannot be eliminated by farsighted eyeglass lenses designed mainly for improving the adjustment function of the eye. That is, myosis, shallowing of anterior chamber, yellowing and hardening of an eye lens, or contraction of retina rear end may occur with age. Yellowing of eye lens increases absorption of short wavelength light, and hardening of eye lens scatters light, increases the luminance on the retina surface, and reduces contrast vision. Myosis and an increase in optical density of the eye lens with age (yellowing of eye lens with age increases absorption of short wavelength region in visible light) increases an absolute threshold of sight, which indicated as the product of quantity of light which comes in eyes multipled by area of pupil. Such aging of intraocular tissues causes myiodesopsia in a light place, a light veil, and dazzling of light, source or reflection. These effects appear as the phenomena the light of a car running in the opposite direction is dazzling, when direct reflection from the surface of an object or bright light source comes in to sight, and when the white bright of a paper covers over letters while reading a book. The transparent plastic material of the present invention can always be used in daily life, and can block or reduce intense light of a wavelength region of high sight sensitivity and block ultraviolet light, and the above phenomena can be minimized to reduce or prevent eye fatigue.

Display filters, optical apparatus lenses and filters of cameras and the like comprising the transparent plastic material of the present invention have properties to selectively block or reduce only light of a specific wavelength.

(1) Since the transparent plastic material of the present invention contains the chemically stable complex compound of Formula (I) which has good compatibility with polymerizable monomers or thermoplastic resins and selective absorptivity to light of a specific wavelength and ultraviolet absorptivity, there is no variation in color, no precipitation, high transparency, improved selective absorptivity to light of a specific wavelength, and blocking of harmful ultraviolet light.

(2) Since the transparent plastic material of the present invention uses the complex compound of Formula (I) which has good compatibility with hydrophobic polymerizable monomers, a water-soluble metal salt and a hydrophilic polymerizable monomer do not need to be used, and can improve water resistance and dimensional stability.

(3) Since the transparent plastic material of the present invention contains the complex compound of Formula (I) which absorbs ultraviolet light, it is not necessary to add an ultraviolet absorber separately, and if such is to be added, since the amount of addition can be substantially reduced, problems with compatibility such as precipitation of the ultraviolet absorber are eliminated, and deterioration of the mechanical characteristics of the polymer is prevented.

(4) Optical articles comprising the transparent plastic material of the present invention can selectively block or reduce only light of a wavelength which is dazzling to the human eye, and can block harmful ultraviolet light.

(5) Eyeglass lenses comprising the transparent plastic material of the present invention has properties to selectively block or reduce only light of a wavelength which is dazzling to the human eye, and can block harmful ultraviolet light.

(6) Since eyeglass lenses comprising the transparent plastic material of the present invention has a glare-proof function to block or reduce strong light of a wavelength range of high sight sensitivity and can block harmful ultraviolet light, these lenses protect the eyes from ultraviolet light and can reduce prevent eye fatigue.

(7) Farsighted eyeglass lenses, contact lenses, and display filters comprising the transparent plastic material of the present invention have similar effects as shown in (5) and (6).

(8) Optical apparatus lenses and filters comprising the transparent plastic material of the present invention have a high transparency, an improved selective absorption function to light of a specific wavelength, and can block harmful ultraviolet light.

(9) Since the complex compound of Formula (I) used in the present invention has good compatibility with polymerizable monomers and is chemically stable, transparent plastic material and optical articles of the present invention can be obtained which have high transparency and high optical uniformity with no precipitation generated nor variation in color in cast molding occurring.

(10) Since the complex compound of Formula (I) used in the present invention has good compatibility with thermoplastic resins and is chemically stable, and can be mixed and uniformly melted with molten thermoplastic resins, the transparent plastic material and optical articles of the present invention can be obtained which have high transparency and high optical uniformity with no precipitation generated nor variation in color in injection molding.

(11) The production method in which a composition comprising one or more polymerizable monomers, a polymerization initiator or catalyst, and the complex compound of Formula (I) used in the present invention is polymerized to form a thin film layer on a substrate comprising the transparent plastic material of the present invention can be applied to all types of transparent plastic materials, since it can provide the transparent plastic material and optical articles of the present invention by treatment after molding which have no differences in color density due to differences in thickness.

BRIEF DESCRIPTION OF THE DRAWINGS

FIG. 19 is a schematic view showing a steric structure of aquahydroxy(1-phenyl-1,3-butanedionato)neodymium complex.

BEST MODE FOR PRACTICING THE INVENTION

Figure 1:
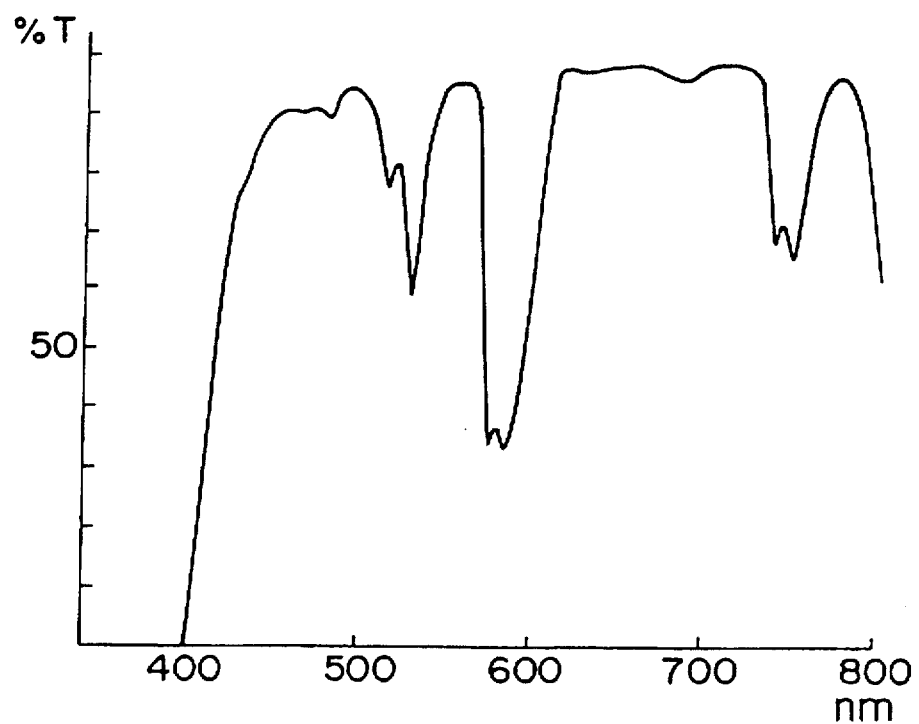
FIG. 1 is a diagram showing the spectral characteristics of the lens of Example 1.

The present invention will now be described in ever detail with reference to the examples. However, the present invention is not limited to the examples.

Synthesis Examples of Two-Coordination Complex Compound (SYNTHESIS EXAMPLE 1)

Synthesis of Aquahydroxy(1-phenyl-1,3-butanedionato) neodymium

To a solution of 32.4 g (0.20 mole) of benzoylacetone and 43.8 g (0.10 mole) of neodymium nitrate dissolved in 120 ml of methanol, 120 ml of 4% aqueous ammonia solution was added dropwise. After the addition, the mixture was reacted at 20° to 25° C. for 1 hour, the precipitated blue-violet crystal was filtered, and washed with water to obtain a compound, which was subjected to elementary analysis (Nd content), water content analysis, and measurement of infrared absorption spectrum to obtain the following results.

Elementary Analysis: C20H21O6Nd=501.63

|   | Measured value | Calculated value |
|---|---|---|
| C | 47.94 | 47.88 |
| H | 3.90 | 4.22 |

Nd Content: measured 30.0% (calculated 28.8%)

Water Content: measured 4.1% (calculated 3.6%)

IR Spectrum (KBr, cm$^{-1}$): 3355, 3063, 1597, 1529, 1485, 1382, 1237, 714

From the above results, the resulting substance was confirmed to be $(C_6H_5COCHCOCH_3)_2Nd(OH)(H_2O)$. (Formula (1-1-a)).

(SYNTHESIS EXAMPLE 2)

Synthesis of Aquahydroxy(1-phenyl-1,3-butanedionato) erbium

To a solution of 32.4 g (0.20 mole) of benzoylacetone and 46.1 g (0.10 mole) of erbium nitrate dissolved in 125 ml of methanol, 120 ml of 4% aqueous ammonia solution was added dropwise. After the addition, the mixture was reacted at 20° to 25° C. for 1 hour, precipitated rose-colored crystal was filtered, and washed with water to obtain a compound, which was subjected to elementary analysis (Er content), water content analysis, and measurement of infrared absorption spectrum to obtain the following results.

Elementary Analysis: C$_{20}$H$_{21}$O$_6$Er=524.65

|   | Measured value | Calculated value |
|---|---|---|
| C | 45.79 | 45.78 |
| H | 3.87 | 4.03 |

Er Content: measured 32.5% (calculated 31.9%)

Water Content: measured 4.4% (calculated 3.4%)

IR Spectrum (KBr, cm$^{-1}$): 3620, 1600, 1525, 1486, 1394, 1283, 711

From the above results, the resulting substance was confirmed to be $(C_6H_5COCHCOCH_3)_2Er(OH)(H_2O)$ (Formula (1-1-b)).

(SYNTHESIS EXAMPLE 3)

Synthesis of aquahydroxy(phenacylphenylketonato) neodymium, aquahydroxy(1-phenyl-2-methyl-1,3-butanedionato)neodymium, and aquahydroxy(1-thiophenyl-1,3-butanedionato)neodymium Synthesis was conducted using the same procedure as in Synthesis Example 1 and Synthesis Example 2 except that benzoylacetone was replaced with phenacylphenylketone, or 1-phenyl-2-methyl-1,3-butanedione, or 1-thiophenyl-1,3-butanedione.

The resulting substances were confirmed to be

Aquahydroxy(phenacylphenylketonato)neodymium of Formula (1-2-a),

Aquahydroxy(1-phenyl-2-methyl-1,3-butanedionato) neodymium of Formula (1-3-a), and Aquahydroxy(1-thiophenyl-1,3-butanedionato) neodymium of Formula (1-4-a), respectively.

TEST EXAMPLES

Test Examples showing the effects of the present invention are described below.

(Test Example 1)

Solubility test in polymerizable monomers

Aquahydroxy(1-phenyl-1,3-butanedionato)neodymium of Synthesis Example 1, aquahydroxy(1-phenyl-1,3-butanedionato)erbium of Synthesis Example 2, aquahydroxy(phenacylphenylketonato)neodymium, aquahydroxy(1-phenyl-2-methyl-1,3-butanedioriato) neodymium, and aquahydroxy(1-thiophenyl-1,3-butanedionato)neodymium of Synthesis Example 3 were soluble in styrene, divinylbenzene, phenyl methacrylate, tetrahydrofurfuryl methacrylate, methyl methacrylate, benzyl methacrylate, diallylphthalate, diethyleneglycolbisallylcarbonate, and o-chlorostyrene.

The three-coordination complex was also soluble in the monomer of the above examples.

(Test Example 2)

Improvement of solubility of two-coordination complex in polymerizable monomers

Results of dissolving the two-coordination complex aquahydroxy(1-phenyl-1,3-butanedionato)neodymium in individual monomers at 20° C. are shown in Table 4.

For comparison, the solubility of the three-coordination complex trisbenzoylacetonatoneodymium of Japanese Patent Application 05-502109 (PCT/JP92/00883: International Laid-open WO93/01233; U.S. Ser. No. 08/027,173) is shown in Table 4.

The above trisbenzoylacetonatoneodymium was synthesized by the method disclosed in Japanese Patent Application 05-502109 (PCT/JP92/00883; International Laid-open WO93/01233; U.S. Ser. No. 08/027,173).

TABLE 4

| Monomer (g) | | Complex Compound | Dissolved Amount (g) |
|---|---|---|---|
| Test Example 2 | | | |
| Styrene | 10.0 | Aquahydroxy (1-phenyl-1,3-butanedionato) neodymium | 30.0 |
| Methyl methacrylate | 10.0 | Aquahydroxy (1-phenyl-1,3-butanedionato) neodymium | 25.0 |
| Benzyl methacrylate | 10.0 | Aquahydroxy (1-phenyl-1,3-butanedionato) neodymium | 30.0 |
| Comparative Example | | | |
| Styrene | 10.0 | Trisbenzoyl acetonato neodymium | 2.5 |
| Methyl methacrylate | 10.0 | Trisbenzoyl acetonato neodymium | 2.0 |
| Benzyl methacrylate | 10.0 | Trisbenzoyl acetonato neodymium | 2.5 |

As shown in the Table, it was confirmed that the two-coordination complex is very high (about 15 times higher) in solubility compared with the three-coordination complex.

From the above results, the following advantages can be asserted.

(1) Content of the two-coordination complex can be increased to a great extent.
(2) Content of the two-coordination complex can be flexibly determined according to the application and purpose of the molding (lens).

As an example, sufficient effects (glare-proof function, eye fatigue prevention, etc.) can be obtained by increasing the content of the two-coordination complex when the thickness of the molding is to be reduced (central thickness of the lens is to be reduced). This is shown later (shown in test examples).

(Test Example 3)

Results of dissolving the aquahydroxy(1-phenyl-1,3-butanedionato)erbium synthesized in Synthesis Example 2 in individual monomers at 20° C. are shown in Table 5. For comparison, the solubility of trisbenzoylacetonatoerbium of Japanese Patent Application 05-502109 (PCT/JP92/00883; International Laid-open WO93/01233: U.S. Ser. No. 08/027, 173) is shown in Table 5.

Trisbenzoylacetonatoerbium was synthesized by the method of "Production Example 2" disclosed in Japanese Patent Application 05-502109 (PCT/JP92/00883; International Laid-open WO93/01233; U.S. Ser. No. 08/027,173).

TABLE 5

| Monomer (g) | | Complex Compound | Dissolved Amount (g) |
|---|---|---|---|
| Test Example 3 | | | |
| Styrene | 10.0 | Aquahydroxy (1-phenyl-1,3-butanedionato) erbium | 30.0 |
| Methyl methacrylate | 10.0 | Aquahydroxy (1-phenyl-1,3-butanedionato) erbium | 25.0 |
| Benzyl methacrylate | 10.0 | Aquahydroxy (1-phenyl-1,3-butanedionato) erbium | 30.0 |
| Comparative Example | | | |
| Styrene | 10.0 | Trisbenzoyl acetonato erbium | 2.5 |
| Methyl methacrylate | 10.0 | Trisbenzoyl acetonato erbium | 2.0 |
| Benzyl methacrylate | 10.0 | Trisbenzoyl acetonato erbium | 2.5 |

(Test Example 4)

Changes in content of the two-coordination complex

To 36 parts by weight of styrene, 60 parts by weight of 2,2-bis(4-methacroyloxyethoxy-3,5-dibromophenyl) propane, and 4 parts by weight of diethyleneglycolbisallylcarbonate, 1 phm of aquahydroxy (1-phenyl-1,3-butanedionato)neodymium of synthesis example 2 was mixed,and then 1 phm of t-butylperoxyneodecanoate as an initiator is added and filtered. The filtrate was injected into a mold, comprising two glass flat plates and a gasket of ethylene-vinyl acetate copolymer,whose the clearance is 2 mm.

Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, and cooled to 70° C. in 2 hours.

The gasket was removed, and the resulting molding was separated from the glass flat plates. The resulting molding was annealed at 100° C. for 2 hours.

In the same method, flat moldings were obtained with the amounts of aquahydroxy(1-phenyl-1,3-butanedionato) neodymium of 2 phm, 5 phm, and 10 phm.

The thus obtained moldings had high transparency.

Figure 5:
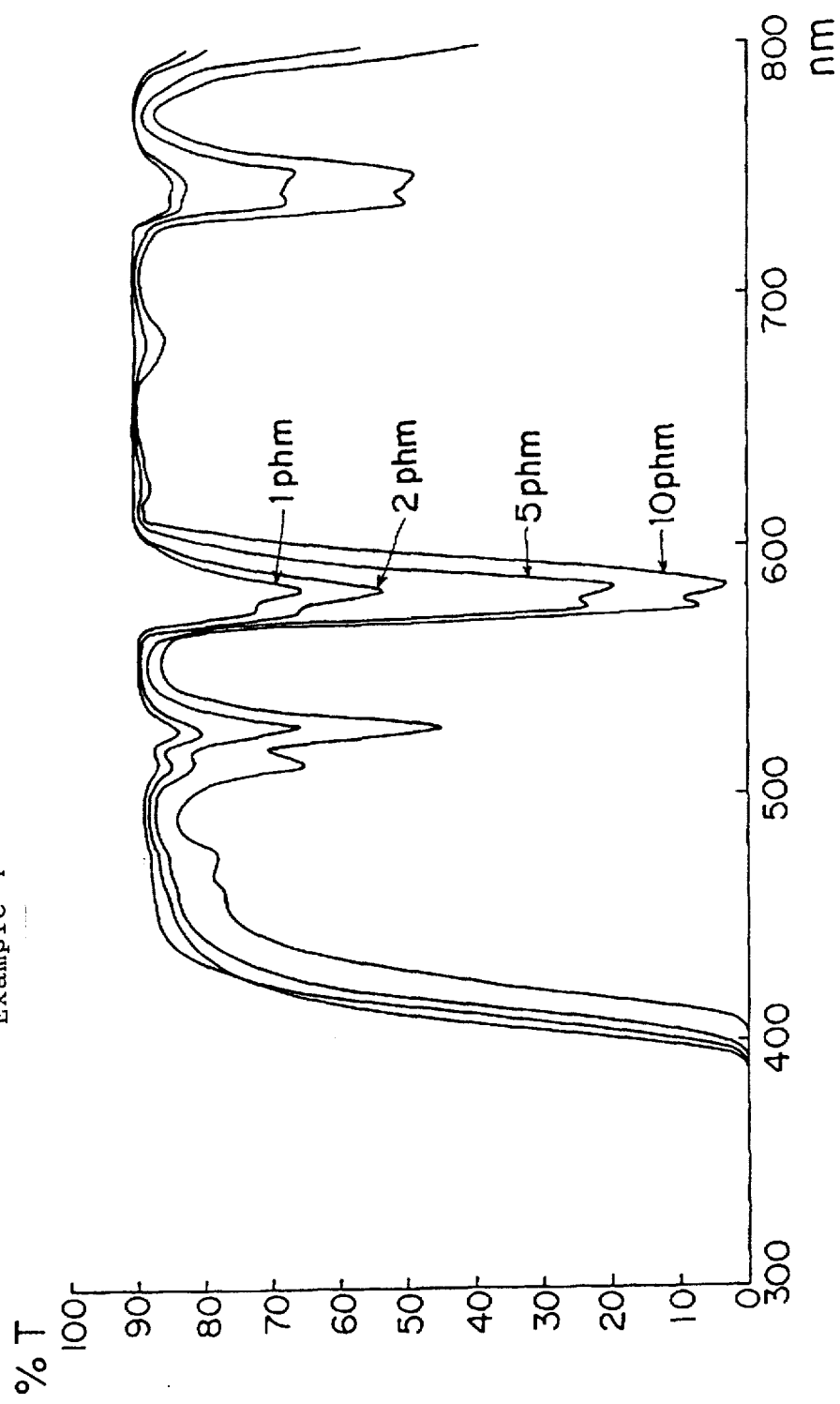
FIG. 5 is a diagram showing the spectral characteristics of the molding of Test Example 4.

The spectral characteristics of the moldings are shown in FIG. 5. As shown in FIG. 5, the transmittance was 68% at 580 nm, which is the characteristic absorption wavelength of neodymium atom, when the content of aquahydroxy(1-phenyl-1,3-butanedionato)neodymium was 1 phm,18% when the content was 5 phm, and 2% when the content was 10 phm.

Figure 6:
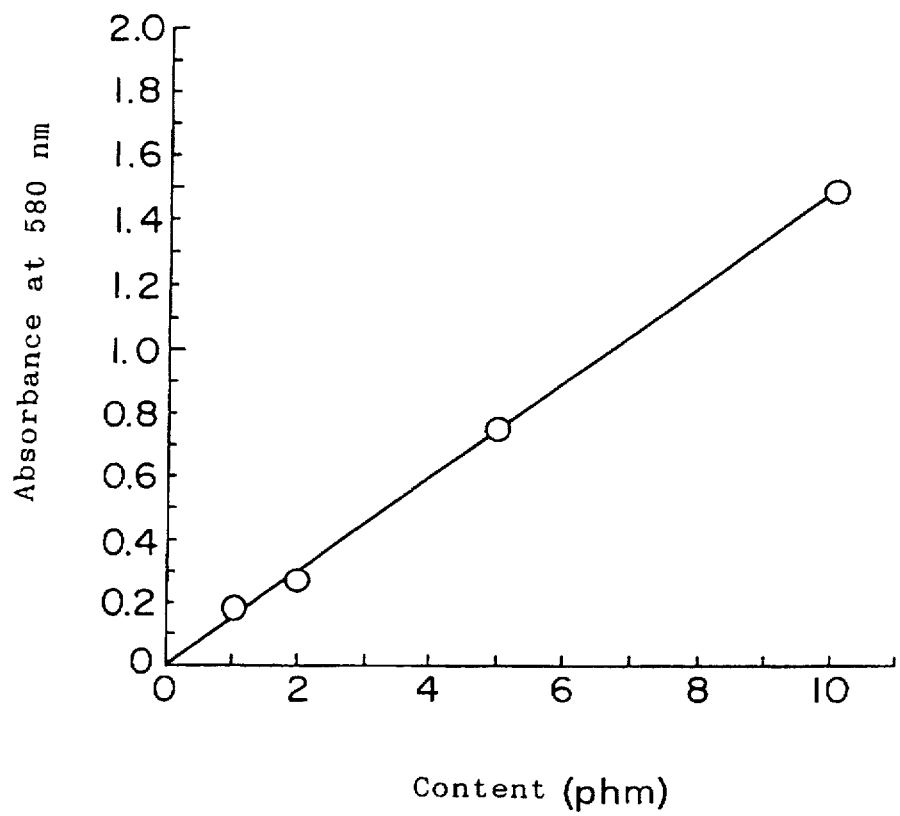
FIG. 6 is a diagram showing the amount of aquahydroxy (1-phenyl-1,3-butanedionato)neodymium of Test Example 4 vs. absorbance at the characteristic absorption wavelength of the neodymium atom.

The relationship between the content of aquahydroxy(1-phenyl-1,3-butanedionato)neodymium and the absorbance at 580 nm of the resulting molding is shown in FIG. 6.

As shown in FIG. 6, the glare-proof effect was comfirmed to increases with increasing content of aquahydroxy(1-phenyl-1,3-butanedionato)neodymium of the resulting transparent molding.

These results show that since the solubility of the three-coordination complex, the range of content for forming a transparent molding is considerably increased, and the amount of the two-coordination complex can be flexibly selected according to the purpose and application.

(Test Example 5)

Differences in changes over time and coloring

Figure 10:
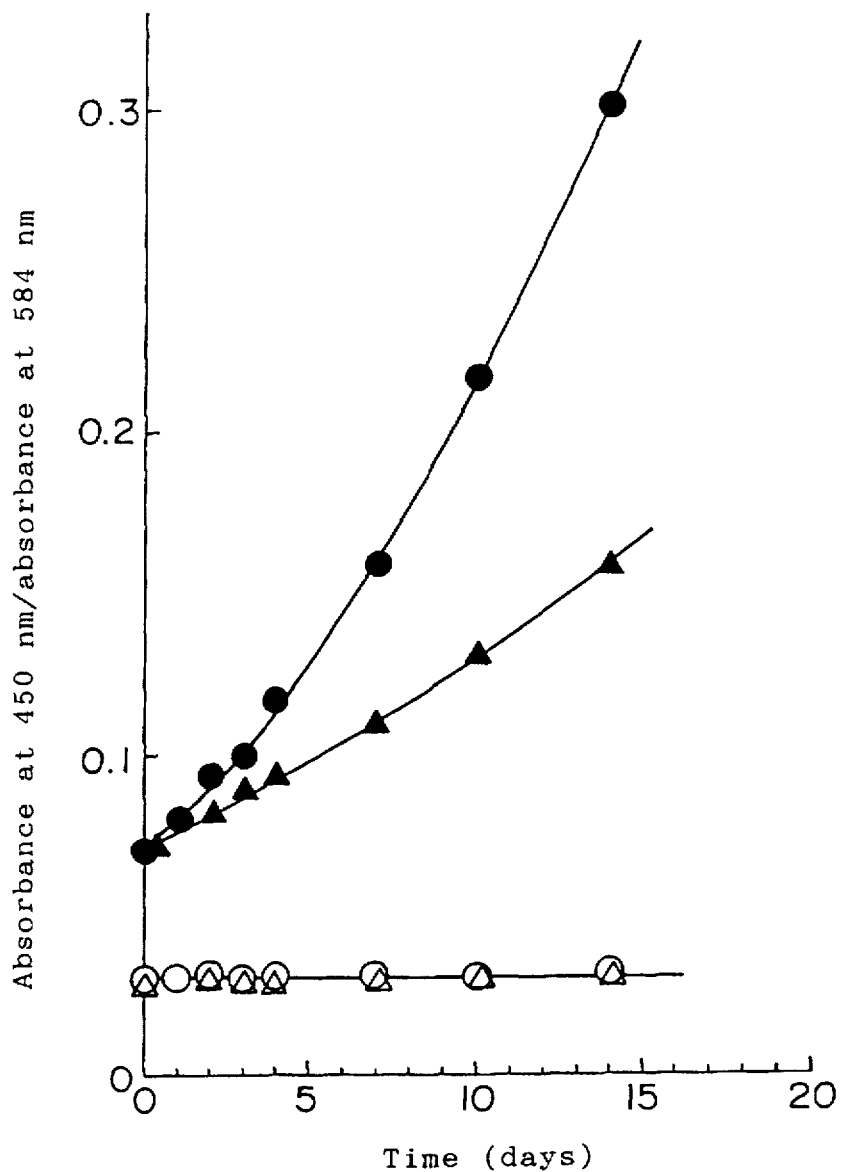
FIG. 10 is a diagram showing changes with the passage of time of aquahydroxy(1-phenyl-1,3-butanedionato) neodymium in the molding of Test Example 5 under irradiation with a fluorescent lamp.

Four grams of aquahydroxy(1-phenyl-1,3-butanedionato) neodymium was dissolved in 100 g of styrene, and checked for changes with the passage of time under irradiation with a fluorescent lamp (700 lx) and in a dark place at 20° C. The results are shown in FIG. 10. Under any of the conditions under irradiation with the fluorescent lamp and the dark place, the styrene solution which was initially in blue-violet showed no change after 2 weeks, and was blue-violet in color.

As a comparison with the present example, 4 g of tris-benzoylacetonatoneodymium was dissolved in 100 g of styrene, and checked for changes with the passage of time under irradiation with a fluorescent lamp (700 lx) and in a dark place at 20° C. The results are shown in FIG. 10. The solution which was initially blue-violet became green with the passage of time, and after the passage of 2 weeks, the solution was yellow-brown and a yellow-brown precipitation was generated. Further, in the dark, change, were smaller as compared with those under irradiation with the fluorescent lamp, but the color changed to yellow-green after 2 weeks.

(Test Example 6)

Figure 11:
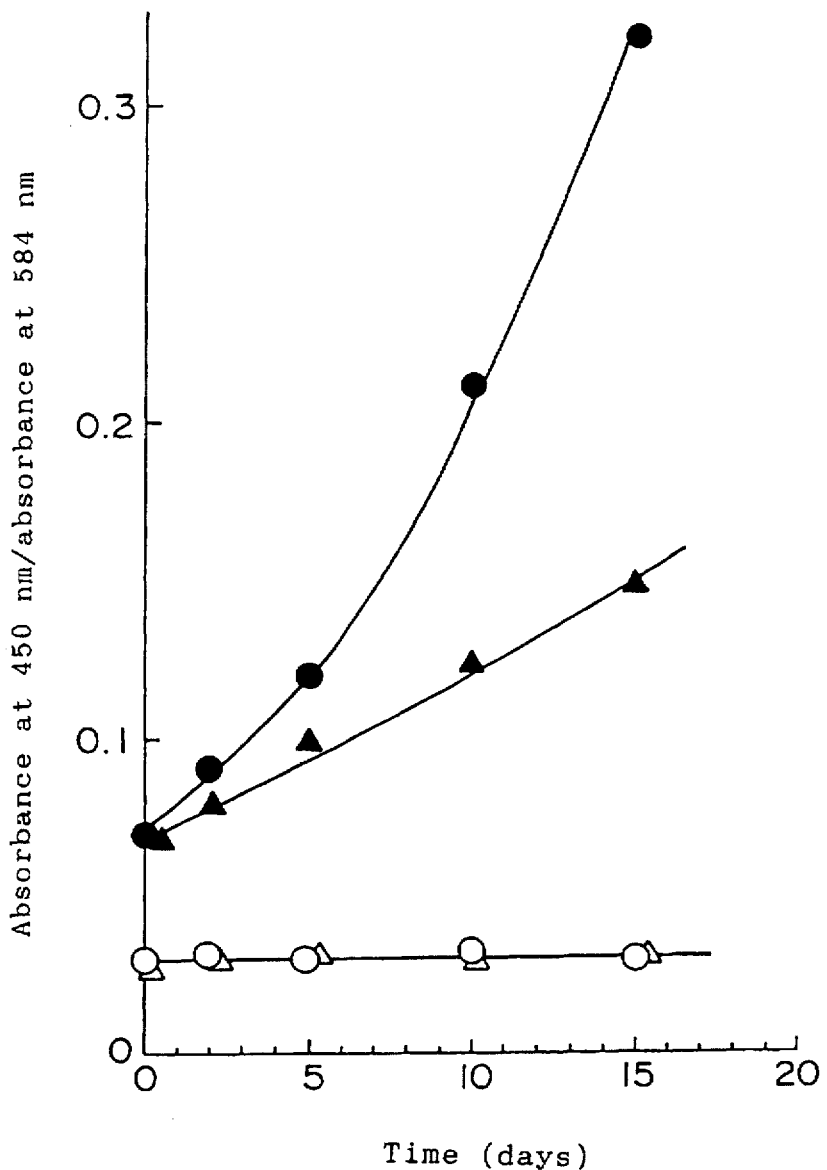
FIG. 11 is a diagram showing changes with the passage of time of aquahydroxy(1-phenyl-1,3-butanedionato)erbium in the molding of Test Example 6 under irradiation with a fluorescent lamp.

Four grams of aquahydroxy(1-phenyl-1,3-butanedionato) erbium was dissolved in 100 g of styrene, and checked for changes with the passage of time under irradiation with a fluorescent lamp (700 lx) and in the dark at 20° C. The results are shown in FIG. 11. Under any of the conditions under irradiation with the fluorescent lamp and in the dark, the styrene solution which was initially rose showed no change after 2 weeks, and was rose-colored.

As a comparison with the present example, 4 g of tris-benzoylacetonatoerbium was dissolved in 100 g of styrene, and checked for changes with the passage of time under irradiation with a fluorescent lamp (700 lx) and in the dark at 20° C. The results are shown in FIG. 11. The solution which was initially rose-colored became brown with the passage of time, and after the passage of 2 weeks, the solution was yellow-brown and a yellow-brown precipitate was generated. Further, in the dark, changes were smaller as compared with those under irradiation with the fluorescent lamp, but the color changed to brown after 2 weeks.

(Test Example 7)

Ten grams of aquahydroxy(1-phenyl-1,3-butanedionato) neodymium was dissolved in 100 g of methyl butanedionato)neodymium was dissolved in 100 g of methyl methacrylate, and checked for changes with the passage of time under irradiation with a fluorescent lamp (700 lx) and in the dark at 20° C. As a comparison, 10 g of trisbenzoylacetonatoneodymium was dissolved in 100 g of methyl methacrylate, and checked for changes with the passage of time under the same conditions. The results are shown in Table 6.

TABLE 6

| Complex Compound | Monomer | Test Condition | Time Initial | After 2 Weeks |
|---|---|---|---|---|
| Test Example | | | | |
| Aquahydroxy (1-phenyl-1,3-butanedionato) neodymium | Methyl methacrylate | Under fluorescent lamp (700 lx) at 20° C. | Blue-violet No precipitation | Blue-violet No precipitation |
| | | Dark place at 20° C. | Blue-violet, No precipitation | Blue-violet, No precipitation |
| Comparative Example | | | | |
| Trisbenzoyl acetonato neodymium | Methyl methacrylate | Under fluorescent lamp (700 lx) at 20° C. | Blue-violet No precipitation | Yellow-brown Precipitation occurs |
| | | Dark place at 20° C. | Blue-violet, No precipitation | Yellow-green No precipitation |

(Test Example 8)

Figure 12:
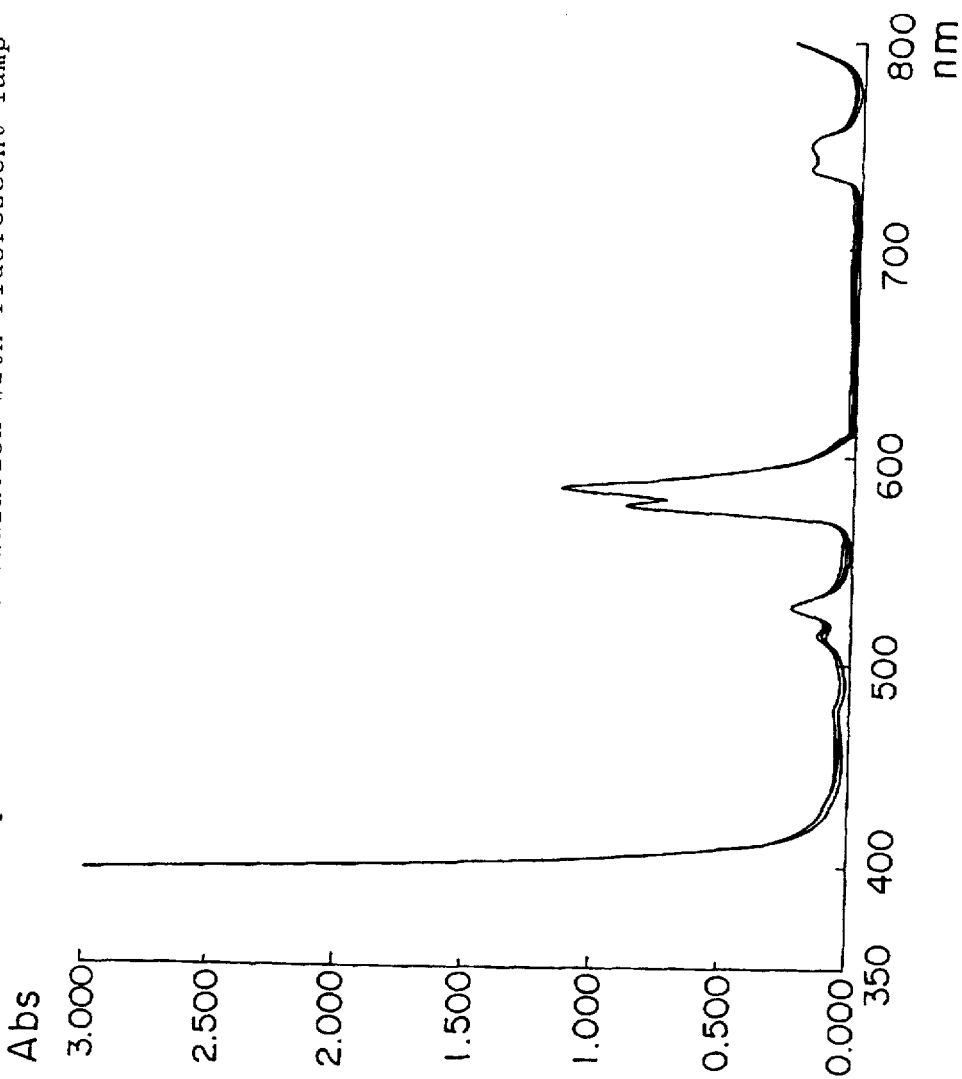
FIG. 12 is a diagram showing changes with the passage of time of aquahydroxy(1-phenyl-1,3-butanedionato) neodymium—styrene solution of Test Example 8 under irradiation with a fluorescent lamp.
Figure 13:
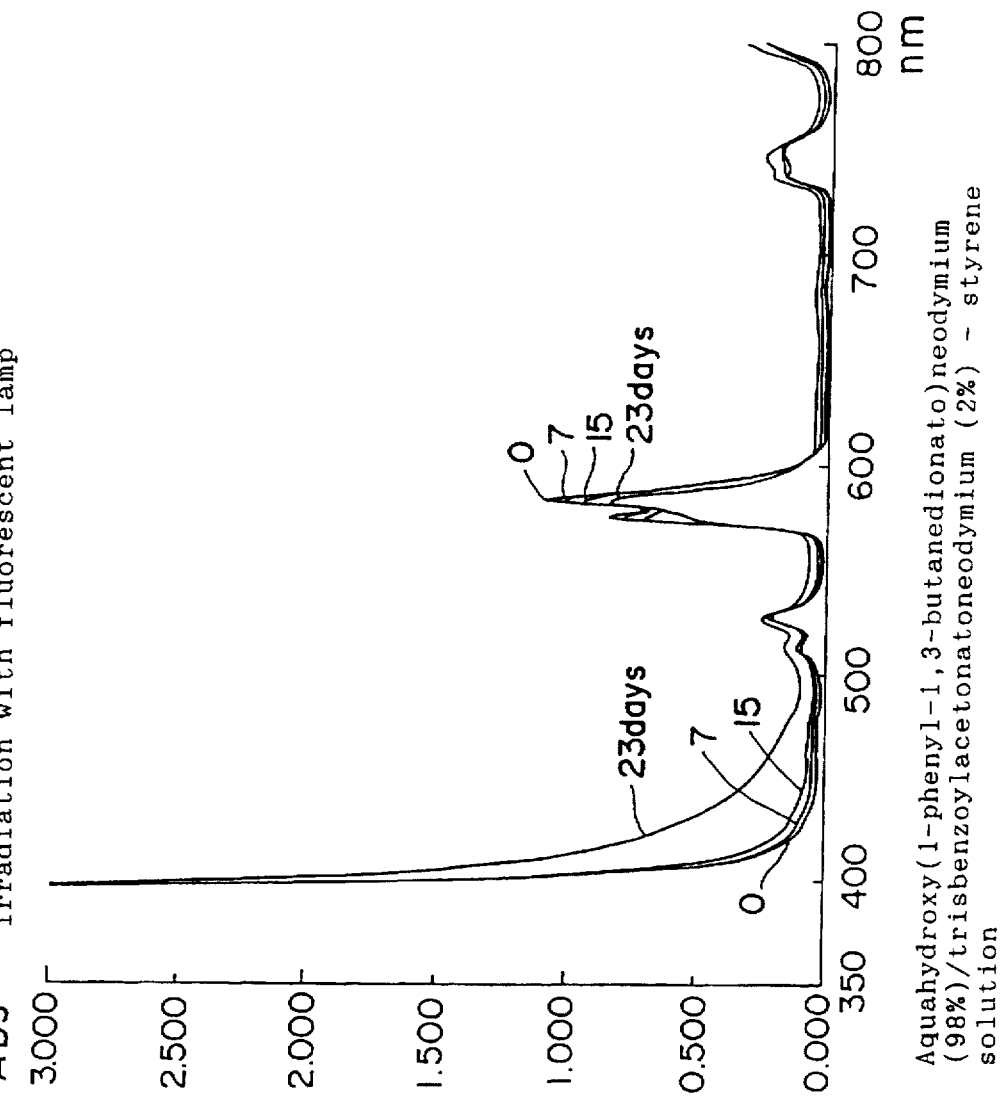
FIG. 13 is a diagram showing changes with the passage of time of aquahydroxy(1-phenyl-1,3-butanedionato) neodymium (98%)/trisbenzoylacetonatoneodymium (2%) —styrene solution of Test Example 8 under irradiation with a fluorescent lamp.
Figure 14:
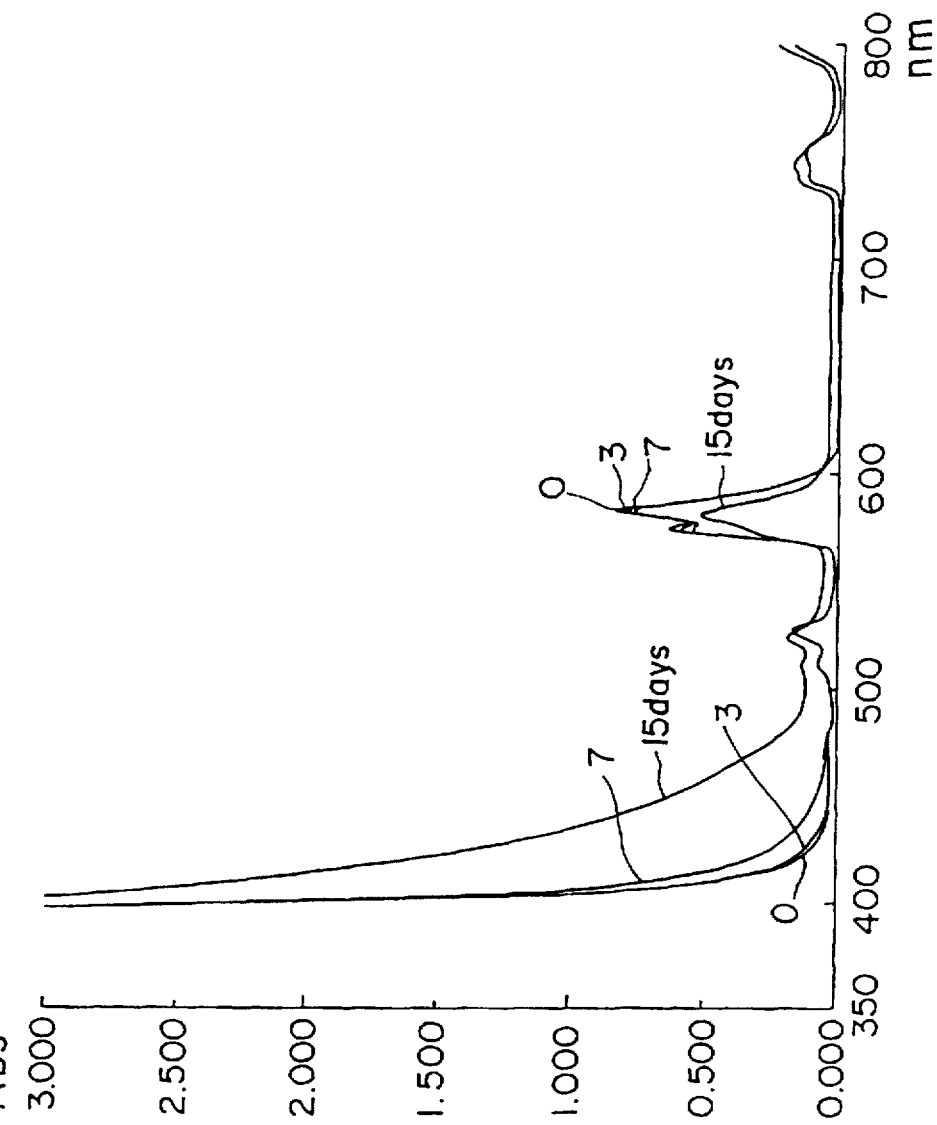
FIG. 14 is a diagram showing changes with the passage of time of trisbenzoylacetonatoneodymium of Test Example 8 under irradiation with a fluorescent lamp.
Figure 15:
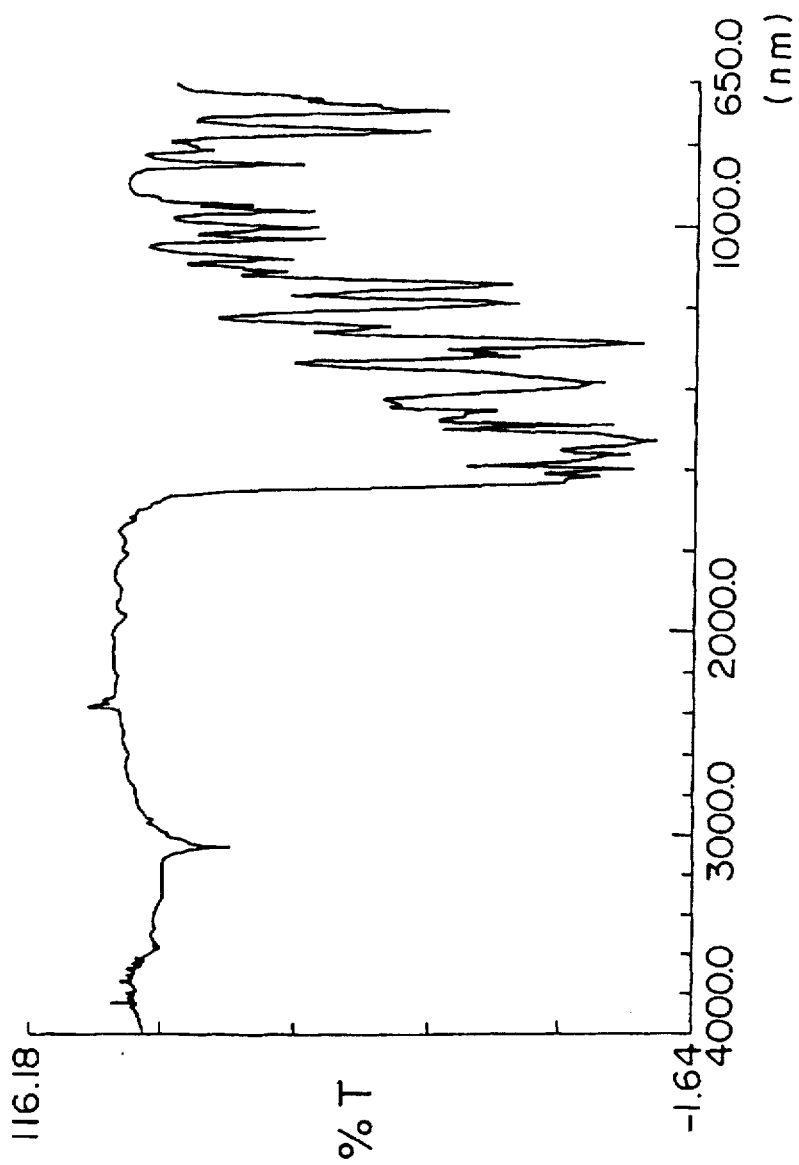
FIG. 15 is a diagram showing an infrared absorption spectrum of aquahydroxy(1-phenyl-1,3-butanedionato) neodymium complex.
Figure 16:
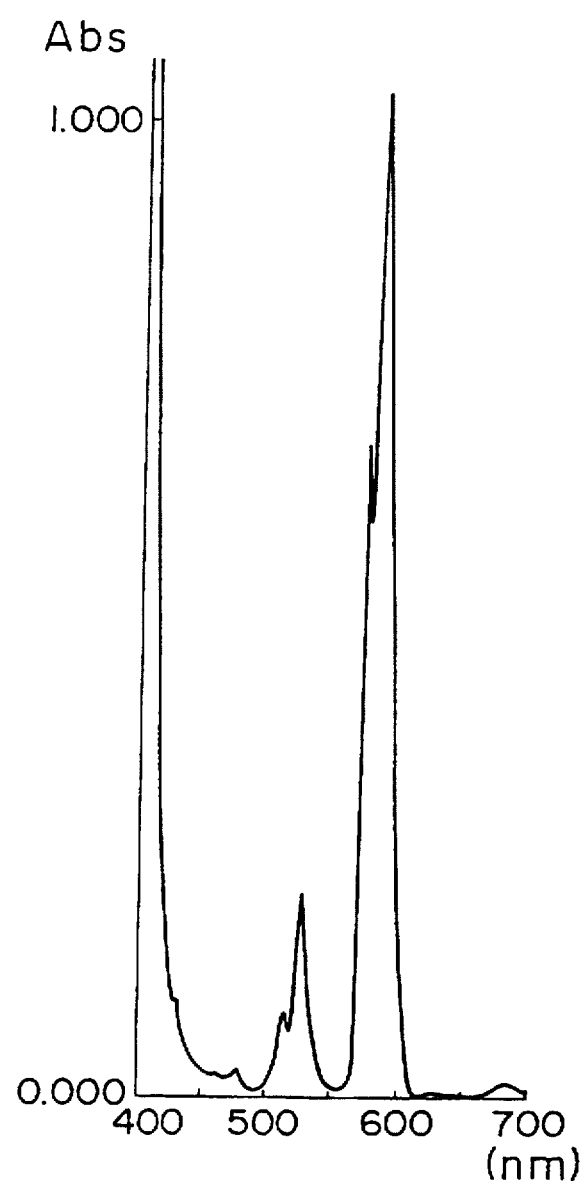
FIG. 16 is a diagram showing a visible/ultraviolet absorption spectrum of a 2% toluene solution of aquahydroxy(1-phenyl-1,3-butanedionato)neodymium complex.
Figure 17:
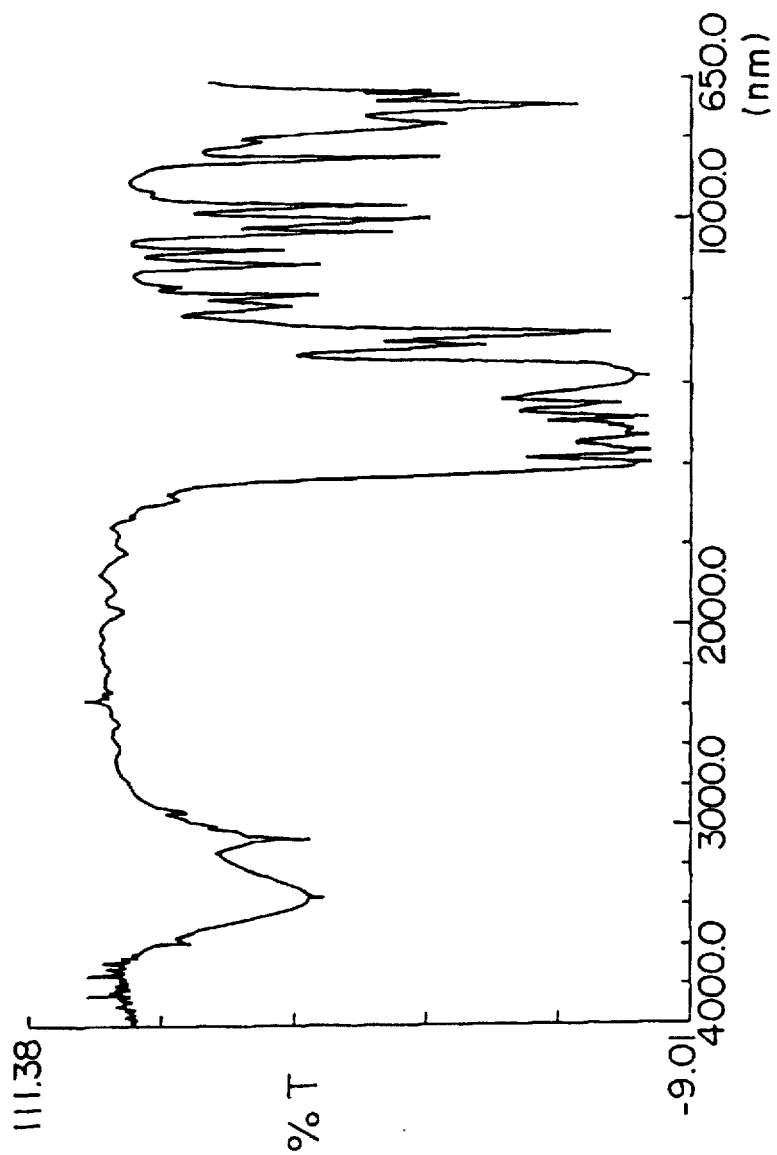
FIG. 17 is a diagram showing an infrared absorption spectrum of trisbenzoylacetonatoneodymium complex.
Figure 18:
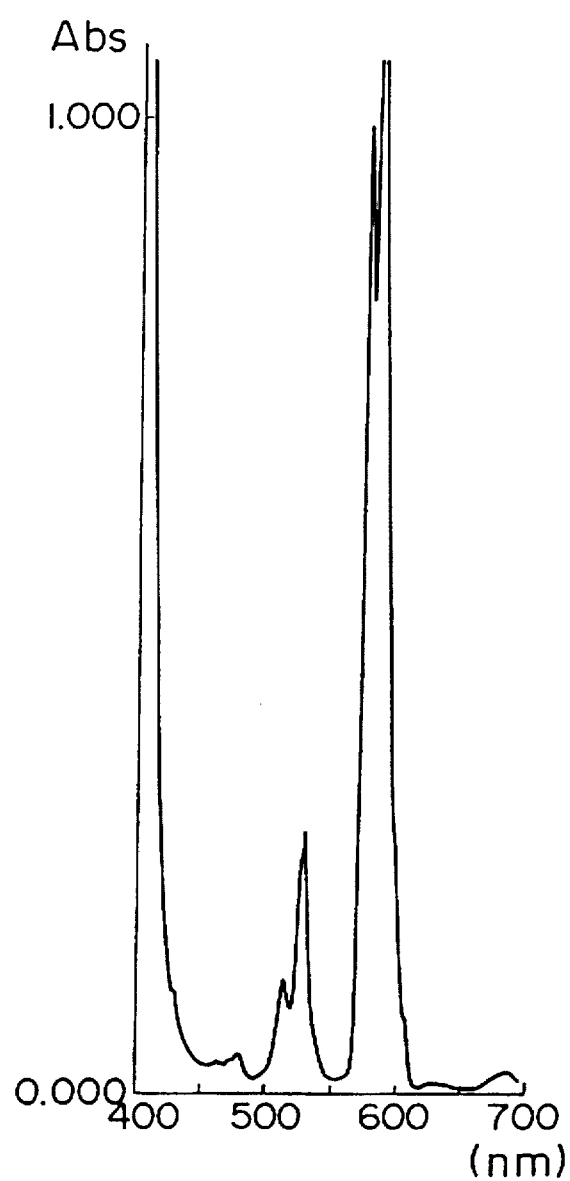
FIG. 18 is a diagram showing a visible/ultraviolet absorption spectrum of a 2% toluene solution of trisbenzoylacetontoneodymium complex.

Changes over time of A combination of A two-coordination complex and A three-coordination complex
(1) Two grains of aquahydroxy(1-phenyl-1,3-butanedionato)neodymium of synthesis example I was dissolved in 100 g of styrene, and checked for changes with the passage of time (0, 7, 15, and 23 days) by absorbance under irradiation with a fluorescent lamp (700 lx) at 20° C. (FIG. 12).
(2) In the same method, 2 g of aquahydroxy(1-phenyl-1,3-butanedionato)neodymium containing 2% of trisbenzoylacetontoneodium as an impurity was dissolved in 100 g of styrene, and checked for changes with the passage of time (0, 7, 15, and 23 days) (FIG. 13).
(Note: this sample was obtained in the initial stage of study on synthesis of the two-coordination complex.)
(3) Trisbenzoylacetonatoneodymium was also checked for changes with the passage of time (0, 3, 7, and 15 days) (FIG. 14).
The individual test results are shown in the Figures.
According to the result of (1) shown in FIG. 12, no changes were noted with the passage of time.
According to the result of (2) shown in FIG. 13, slight changes were noted with the passage of time. However, the rate of change over time is slower as compared with (3) of the three-coordination complex alone.
According to the result of (3) shown in FIG. 14, considerable changes over time were noted.

DETAILED DESCRIPTION OF PREFERRED EXAMPLES

Preferred examples of the present invention are described below, but the present invention is not limited to these examples.

(EXAMPLE 1)

Photopolymerizable composition comprising:

| | |
|---|---|
| Bifunctional urethane methacrylate of Formula (11) | 50 parts by weight |
| Polyethyleneglycol dimethacrylate of Formula (12) | 10 parts by weight |
| Phenyl methacrylate | 40 parts by weight |
| 2-Hydroxy-2-methyl-1-phenylpropan-1-one (Merck Dalocure-1173) | 1 phm |
| t-Butylperoxyisopropylcarbonate | 0.5 phm | was mixed with 3 parts by weight of aquahydroxy(1-phenyl-1,3-butanedionato)neodymium of synthesis example 1, and dissolved at 50° C.

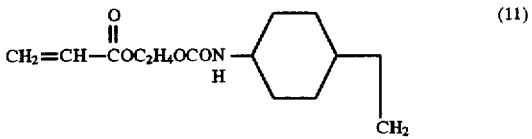

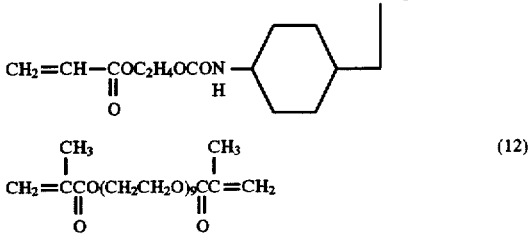

The resulting mixture was blue-violet colored and transparent. The mixture was injected into a mold comprising a mirror-finishied glass mold with an outer diameter of 80 mm and a curvature radius of 386 mm, a glass mold with an outer diameter of 80 mm and a curvature radius of 65 mm, and a gasket formed of ethylene-vinyl acetate copolymer to form a concave lens with a central thickness of 1.5 mm. The mold was continuously irradiated for 3 minutes with a 2 kW high-pressure mercury lamp from both sides of the mold at an illuminance of 400 mW/cm$^2$ to harden the mixture. When the mold temperature was decreased to 60° C., the lens was released from the glass mold. After the lens was washed, it was annealed at 100° C. for 2 hours.

The resulting lens was blue-green colored, the light transmissivity at 580 nm was as low as 30%, blocked ultraviolet light of less than 400 nm in wavelength, and the transmissivity of other wavelength area was more than 90%. The spectral characteristics of the lens of the present example are shown in FIG. 1.

The lens was surface treated with a commercial ultraviolet curing type organic hard coating.

As a comparative example, a lens free of aquahydroxy (1-phenyl-1,3-butanedionato)neodymium was prepared, dyed to the same color as the above lens, and surface treated same as the example. The example lens and the comparative example lens were worn for evaluation of the glare. As a result, glare of direct sunlight, and glare of the head light of a car running in the opposite direction at night were greatly reduced as compared with the comparative example lens.

The lens of the present example provided thereon with a reflection-proof film was even smaller in flickering of light. Further, after the lens was allowed to stand in a high temperature and high humidity environment at 60° C. and 90% RH for one week, the absorptivity was 1.0% and no cracking was noted in the deposited film.

(EXAMPLE 2)

Two parts by weight of aquahydroxy(1-phenyl-1,3-butanedionato)neodymium, 36 parts by weight of styrene, 60 parts by weight of 2,2-bis(4-methacryloyloxyethoxy-3,5-dibromophenyl)propane, 4 parts by weight of diethyleneglycolbisallylcarbonate, and I part by weight of t-butylperoxyneodecanoate were mixed and filtered. The filtrate was injected into a mold comprising two glass molds and a gasket of ethylene-vinyl acetate copolymer to obtain lenses of 2 mm of center thickness. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The resulting lens had a refractive index of 1.59, the light transmissivity was as low as 40% at 580 nm, blocked ultraviolet light of less than 400 nm in wavelength, and the transinissivity of other wavelength areas was more than 85%. Therefore, the lens was one which had properties to selectively block or reduce only light of a specific wavelength but did not reduce other visible light, had a superior glare-proof function in light adaptation sight, and blocked ultraviolet light. Further, after the lens was allowed to stand in a high temperature and high humidity environment at 60° C. and 90% RH for one week, the water absorption was 1.0%. This value was much better than Comparative Example 5 which is a system using neodymium acetate as a water-soluble neodymium salt. After the lens was provided on the surface with an inorganic deposition film as a reflection-proof film and allowed to stand in the above high temperature and high humidity environment for one week, no cracking was noted in the deposition film.

Figure 2:
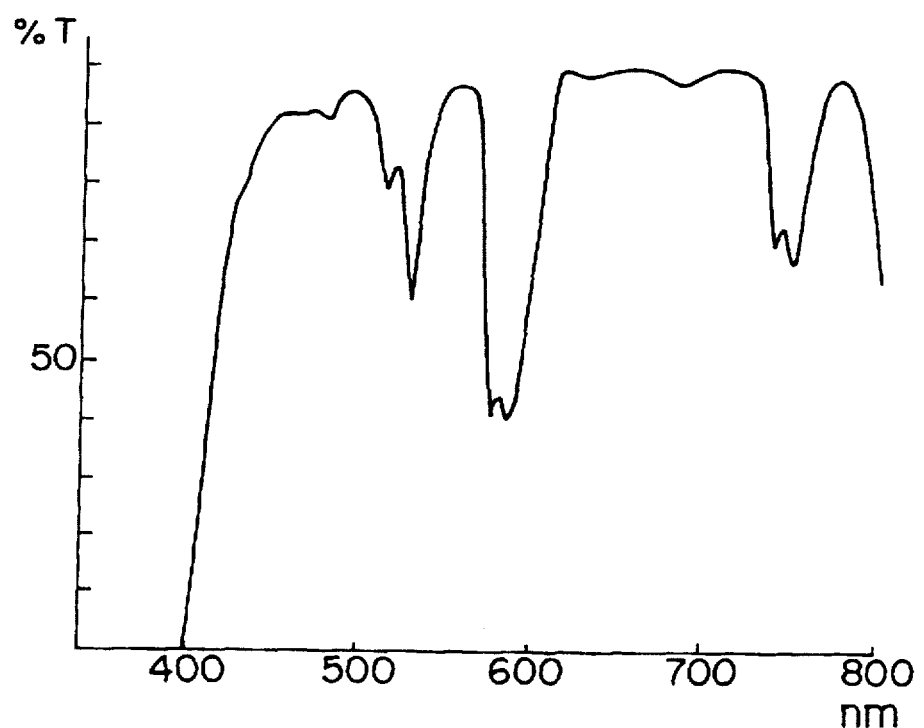
FIG. 2 is a diagram showing the spectral characteristics of the lens of Example 2.

FIG. 2 shows the spectral characteristics of the lens of the present example.

The lens of the present example was attached to an eyeglass frame and subjected to a wearing test. The test will be described below.

The lens used was provided with a reflection-proof film, and a lens of the same composition as the example lens except that aquahydroxy(1-phenyl-1,3-butanedionato) neodymium was removed and dyed to the same color as the example lens was used as a comparative sample. The test was conducted for randomly selected 50 men and women (Age of examinees; 20s:20%, 30s:30%, 40s:30%, 50s:20%). Answers were evaluated in a three-point method: Yes (feel so): 2 points, (feel something like that): 1 point, No (no change): 0 point. The test results are shown below.

TABLE 7

|  | Answer | |
| --- | --- | --- |
| Question | Example 2 | Comparative |
| 1. No glare outdoor, in fine. | 1.8 | 0 |
| 2. No glare while driving a car. | 1.8 | 0 |
| 3. No glare in outdoor sporting. | 1.8 | 0 |
| 4. No glare of headlight of car in opposite direction at night. | 1.7 | 0 |
| 5. No glare of paper surface while reading. | 1.3 | 0 |
| 6. No glare while watching television. | 1.8 | 0 |
| 7. No glare of display in working on a wordprocessor. | 1.9 | 0 |
| 8. Clear view of an object outdoor, in fine. | 1.8 | 0 |
| 9. Clear view of around while driving a car. | 1.8 | 0 |
| 10. Letters on paper are read clearly while reading. | 1.6 | 0 |
| 11. Clear view of television screen. | 1.8 | 0 |
| 12. Clear view of display screen while working on a word processor. | 1.8 | 0 |
| 13. Clear view of object in a light place from a dark place. | 1.8 | 0 |
| 14. No eye fatigue when using outdoor, in fine. | 1.9 | 0 |
| 15. No eye fatigue when driving a car. | 1.7 | 0 |
| 16. No eye fatigue when driving a car at night. | 1.7 | 0 |
| 17. No eye fatigue in reading or writing. | 1.7 | 0 |
| 18. No eye fatigue when watching television for a long time. | 1.8 | 0 |
| 19. No eye fatigue when looking at a movie. | 1.0 | 0 |
| 20. No eye fatigue when looking at a display while working on a wordprocessor for a long time. | 1.8 | 0 |

80% of the examinees observed a glare reduction, effect 70% observed an eye fatigue reduction effect.

(EXAMPLE 3)

Four parts by weight of aquahydroxy(1-phenyl-1,3-butanedionato)erbium, 36 parts by weight of styrene, 60 parts by weight of 2,2-bis(4-methacroyloxyethoxy-3,5-dibromophenyl)propane, 4 parts by weight of diethyleneglycolbisallylcarbonate, and 1 part by weight of t-butylperoxyneodecanoate were mixed and filtered. The filtrate was injected into a mold comprising two glass molds and a gasket of ethylene-vinyl acetate copolymer to obtain lenses of 2 mm of center thickness. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The resulting lens had a refractive index of 1.59, the light transmissivity was as low as 40% at 520 nm, blocked ultraviolet light of less than 400 nm in wavelength, and the transinissivity of other wavelength areas was more than 85%. Therefore, the lens was one which had properties of selectively blocking or reducing light only of a specific wavelength but did not reduce other visible light, had a superior glare-proof function on dark adaptation sight, and blocked ultraviolet light. Further, after the lens was allowed to stand in a high temperature and high humidity environment at 60° C. and 90% RH for one week, the water absorption was 1.0%. This value was much better than Comparative Example 6 which is a system using erbium acetate as a water-soluble erbium salt. After the lens was provided on the surface with an inorganic deposition film as a reflection-proof film and allowed to stand in the above high temperature and high humidity environment for one week, no cracking was noted in the deposition film.

Figure 3:
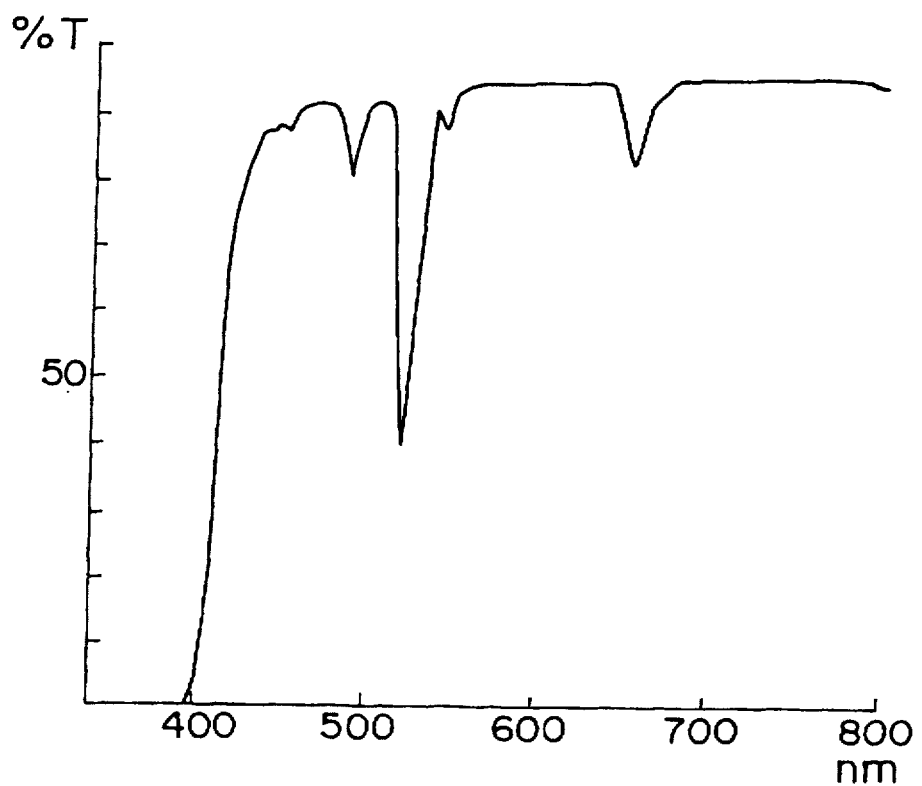
FIG. 3 is a diagram showing the spectral characteristics of the lens of Example 3.

The spectral characteristics of the present example are shown in FIG. 3.

(EXAMPLE 4)

Five parts by weight of aquahydroxy(1-phenyl-1,3-butanedionato)neodymium and 5 parts by weight of aquahydroxy(1-phenyl-1,3-butanedionato)erbium, 36 parts by weight of styrene, 60 parts by weight of 2,2-bis(4-methacryloyloxyethoxy-3,5-dibromophenyl)propane, 4 parts by weight of diethyleneglycolbisallylcarbonate, and 1 part by weight of t-butylperoxyneodecanoate were mixed and filtered. The filtrate was injected into a mold comprising two glass molds and a gasket of ethylene-vinyl acetate copolymer to obtain lenses of 1.5 mm of center thickness. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The resulting lens had a refractive index of 1.59, the light transmissivity was as low as 30% at 520 nm and 30% at 580 nm, and blocked ultraviolet light of less than 400 nm in wavelength, and the transmissivity of other wavelength area was more than 85%. Therefore, the lens was one which had properties to selectively block or reduce only light of a specific wavelength but did not reduce other visible light, had a superior glare-proof function in light adaptation sight, and blocked ultraviolet light. Further, after the lens was allowed to stand in a high temperature and high humidity environment at 60° C. and 90% RH for one week, the water absorption was 1.0%. After the lens was provided on the surface with an inorganic deposited film as a reflection-proof film and allowed to stand in the above high temperature and high humidity environment for one week, no cracking was noted in the deposited film.

Figure 4:
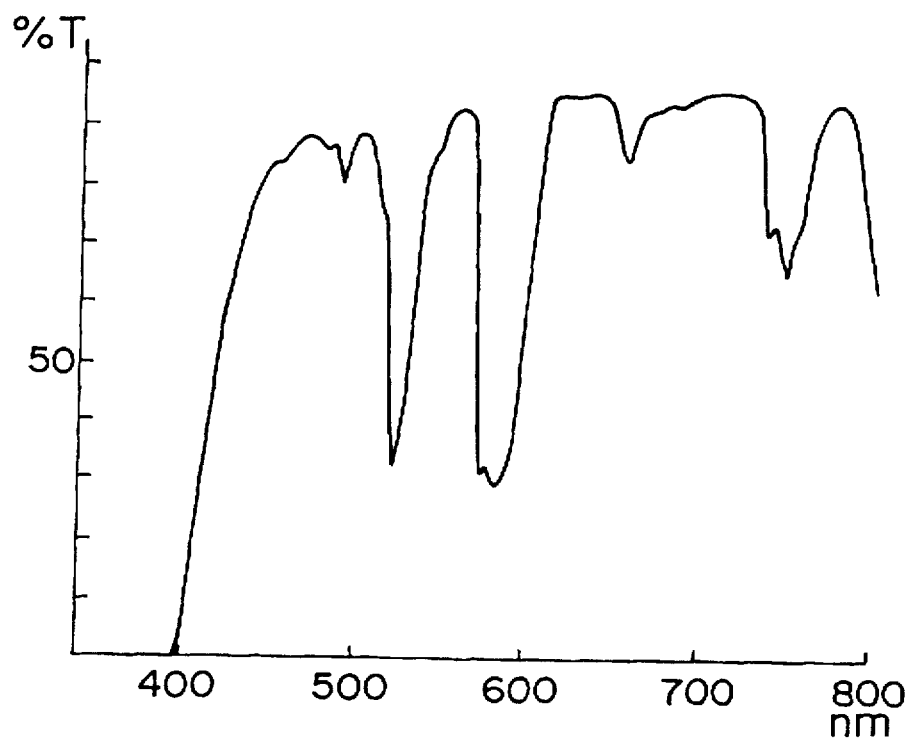
FIG. 4 is a diagram showing the spectral characteristics of the lens of Example 4.

The spectral characteristics of the present example are shown in FIG. 4.

The lens of the present example was attached to a frame and subjected to a wearing test. This test is be described below.

The lens used was provided with a reflection-proof film, and a lens of the same composition as the example lens except that aquahydroxy(1-phenyl-1,3-butanedionato) neodymium and aquahydroxy(1-phenyl-1,3-butanedionato) erbium were removed and dyed to the same color as the example lens was used as a comparative sample. The test was conducted for randomly selected 50 men and women (Age of examinees; 20s:20%, 30s:30%, 40s:30%, 50s:20%). Answers were evaluated in a three-point method: Yes (feel so): 2 points, (feel something like that): 1 point, No (no change): 0 point. The test results are shown in table 8 below.

TABLE 8

| | Answer | |
|---|---|---|
| Question | Example 2 | Comparative |
| 1. No glare outdoor, in fine. | 1.9 | 0 |
| 2. No glare during driving a car. | 1.9 | 0 |
| 3. No glare in outdoor sporting. | 1.9 | 0 |
| 4. No glare of headlight of car in opposite direction at night. | 1.9 | 0 |
| 5. No glare of paper surface while reading. | 1.7 | 0 |
| 6. No glare while watching television. | 1.9 | 0 |
| 7. No glare of display in working on a wordprocessor. | 1.9 | 0 |
| 8. Clear view of an object outdoor, in fine. | 1.9 | 0 |
| 9. Clear view of around while driving a car. | 1.9 | 0 |
| 10. Letters on paper are read clearly while reading. | 1.7 | 0 |
| 11. Clear view of television screen. | 1.9 | 0 |
| 12. Clear view of display screen while working on a word processor. | 1.9 | 0 |
| 13. Clear view of object in a light place from a dark place. | 1.8 | 0 |
| 14. No eye fatigue when using outdoor, in fine. | 1.9 | 0 |
| 15. No eye fatigue when driving a car. | 1.9 | 0 |
| 16. No eye fatigue when driving a car at night. | 1.9 | 0 |
| 17. No eye fatigue in reading or writing. | 1.9 | 0 |
| 18. No eye fatigue when watching television for a long time. | 1.9 | 0 |
| 19. No eye fatigue when looking at a movie. | 1.4 | 0 |
| 20. No eye fatigue when looking at a display while working on a wordprocessor for a long time. | 1.9 | 0 |

(EXAMPLE 5)

Using the same procedure as in Example 2, 4 parts by weight of aquahydroxy(1-phenyl-1,3-butanedionato) neodymium, 36 parts by weight of styrene, 60 parts by weight of 2,2-bis(4-methacryloyloxyethoxy-3,5-dibromophenyl)propane, 4 parts by weight of diethyleneglycolbisallylcarbonate, and 1 part by weight of t-butylperoxyneodecanoate were mixed and filtered. The filtrate was injected into a mold comprising two progressive multiple focus lens glass molds (Seiko Epson HIGHLOAD MXP-1 MILD) and a gasket of ethylene-vinyl acetate copolymer. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The lens of the present example was attached to an eyeglass frame and subjected to a wearing test. The test is be described below.

The lens used was provided with a reflection-proof film, and a lens of the same composition as the example lens except that aquahydroxy(1-phenyl-1,3-butanedionato) neodymium was removed and dyed to the same color as the example lens was used as a comparative sample. The test was conducted for randomly extracted 100 men and women at 40 to 60 ages level. To a plurality of questions on glare reduction, eye fatigue reduction, contrast, and the like, the answers were evaluated in a five-point method: Very Good: 5 points, Good: 4 points, Normal: 2 points, Poor: 1 point, Very Poor: 1 point. The points were averaged for each item. The results are shown below.

TABLE 9

| Item | Example 5 Average | Example 5 Variance | Comparative Average | Comparative Variance |
| --- | --- | --- | --- | --- |
| Glare reduction | 4.50 | 0.4 | 2.90 | 0.2 |
| Eye fatigue prevention | 4.80 | 0.3 | 2.88 | 0.1 |
| Lightness of sight | 4.40 | 0.2 | 4.33 | 0.3 |
| Contrast | 4.60 | 0.3 | 2.80 | 0.2 |

(EXAMPLE 6)

Four parts by weight of aquahydroxy (phenacylphenylketonato)neodymium, 36 parts by weight of styrene, 60 parts by weight of 2,2-bis(4-methacroyloxyethoxy-3,5-dibromophenyl)propane, 4 parts by weight of diethyleneglycolbisallylcarbonate, and 1 part by weight of t-butylperoxyneodecanoate were mixed and filtered. The filtrate was injected into a mold comprising two glass molds and a gasket of ethylene-vinyl acetate copolymer. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The resulting lens had a refractive index of 1.59, the light transinissivity was as low as 40% at 580 nm, and blocked ultraviolet light of less than 400 nm in wavelength, and the transinissivity of other wavelength areas was more than 85%. Therefore, the lens was one which had properties to selectively block or reduce only light of a specific wavelength but did not reduce other visible light, had a superior glare-proof function in light adaptation sight, and blocked ultraviolet light. Further, after the lens was allowed to stand in a high temperature and high humidity environment at 60° C. and 90% RH for one week, the water absorption was 1.0%. This value was much better than Comparative Example 5 which is a system using neodymium acetate as a water-soluble neodymium salt. After the lens was provided on the surface with an inorganic deposition film as a reflection-proof film and allowed to stand in the above high temperature and high humidity environment for one week, no cracking was noted in the deposition film.

(EXAMPLE 7)

Four parts by weight of aquahydroxy(1-phenyl-2-methyl-1,3-butanedionato)neodymium, 36 parts by weight of styrene, 60 parts by weight of 2,2-bis(4-methacroyloxyethoxy-3,5-dibromophenyl)propane, 4 parts by weight of diethyleneglycolbisallylcarbonate, and 1 part by weight of t-butylperoxyneodecanoate were mixed and filtered. The filtrate was injected into a mold comprising two glass molds and a gasket of ethylene-vinyl acetate copolymer. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The resulting lens had a refractive index of 1.59, the light transmissivity was as low as 40% at 580 nm, blocked ultraviolet light of less than 400 nm in wavelength, and the transmissivity of other wavelength areas was more than 85%. Therefore, the lens was one which had properties to selectively block or reduce only light of a specific wavelength but did not reduce other visible light, had a superior glare-proof function in dark adaptation sight, and blocked ultraviolet light. Further, after the lens was allowed to stand in a high temperature and high humidity environment at 60° C. and 90% RH for one week, the water absorption was 1.0%. This value was much better than Comparative Example 5 which is a system using neodymium acetate as a water-soluble neodymium salt. After the lens were provided on the surface with an inorganic deposited film as a reflection-proof film and allowed to stand in the above high temperature and high humidity environment for one week, no cracking was noted in the deposited film.

(EXAMPLE 8)

Four parts by weight of aquahydroxy(1-thiophenyl-1,3-butanedionato)neodymium, 36 parts by weight of styrene, 60 parts by weight of 2,2-bis(4-methacroyloxyethoxy-3,5-dibromophenyl)propane, 4 parts by weight of diethyleneglycolbisallylcarbonate, and 1 part by weight of t-butylperoxyneodecanoate were mixed and filtered. The filtrate was injected into a mold comprising two glass molds and a gasket of ethylene-vinyl acetate copolymer. Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, cooled from 80° C. to 70° C. in 2 hours, and the lens was released from the mold. Further, the resulting lens was annealed at 100° C. for 2 hours.

The resulting lens had a refractive index of 1.59, the light transmissivity was as low as 40% at 580 nm, blocked ultraviolet light of less than 400 nm in wavelength, and transmissivity of other wavelength area was more than 85%. Therefore, the lens was one which had properties to selectively block or reduce only light of a specific wavelength but did not reduce other visible light, had a superior glare-proof function in dark adaptation sight, and blocked ultraviolet light. Further, after the lens was allowed to stand in a high temperature and high humidity environment at 60° C. and 90% RH for one week, the water absorption was 1.0%. This value was much better than Comparative Example 6 which is a system using neodymium acetate as a water-soluble neodymium salt. After the lens was provided on the surface with an inorganic deposited film as a reflection-proof film and allowed to stand in the above high temperature and high humidity environment for one week, no cracking was noted in the deposited film.

(EXAMPLE 9)

Four parts by weight of aquahydroxy(1-phenyl-1,3-butanedionato)neodymium was added to a reaction mixture comprising 52 parts by weight of xylylenediisocynate, 48 parts by weight of 4-mercaptomethyl-3,6-dithia-1,8-octanedithiol, 0.5 part by weight of dibutyltindilaurate as a catalyst, and a small amount of alkyl acid phosphate ester as a release agent, and deaerated for 20 minutes while mixing. The reaction mixture was injected into a mold comprising two glass molds and a gasket of ethylene-vinyl acetate copolymer, gradually increased in temperature from 40° C. to 90° C. in a hot air recirculation oven, and after being maintained at 90° C. for 1 hour, cooled to 60° C. in 1 hour. The lens, obtained by releasing from the mold, was annealed at 100° C. for 2 hours to remove internal stress in the lens. The resulting lens was a blue-green transparent one with a refractive index of 1.66. The light transmissivity of the lens was as low as 40% at 580 nm, blocked ultraviolet light of less than 400 nm in wavelength, and transmissivity of other wavelength area was more than 85%. Therefore, the lens was one which had properties to selectively block or reduce only light of a specific wavelength but did not reduce other visible light, had a superior glare-proof function in light adaptation sight, and blocked ultraviolet light. Further, after the lens was allowed to stand in a high temperature and high humidity environment at 60° C. and 90% RH for one week, the water absorption was 1.3%. After the lens was provided on the surface with an inorganic deposition film as a reflection-proof film and allowed to stand in the above high temperature and high humidity environment for one week, no cracking was noted in the deposition film.

(EXAMPLE 10)

To a silicone-based hard coating solution comprising 28 parts by weight of hydrolysis product of 3-glycidoxypropyltrimethoxysilane, 27.5 parts by weight of colloidal silica (SiO2), 41.9 parts by weight of glycerolpolyglycidylether, 2.1 parts by weight of magnesium perchlorate, 0.5 part by weight of 4,4-thiobis-(3-methyl-6-t-butylphenol), 0.1 part by weight of dimethylsiloxane-methyl(polyoxyethylene)-methyl (polyoxyethylene-methyl(polyoxypropylene)-siloxane copolymer, and a solvent, 30 parts by weight of aquahydroxy(1-phenyl-1,3-butanedionato)neodymium was added and dissolved. The solution was coated on a lens comprising polyethyleneglycolbisallylcarbonate, heated at 100° C. for 1 hour, and further heated at 130° C. for 2 hours. As a result, an eyeglass lens was obtained which had a high surface hardness, a transmissivity of 60% at 580 nm and a transmissivity of other wavelength areas of more than 85%, and a glare-proof function.

(EXAMPLE 11)

95 Parts by weight of methylmethacrylale, 4 parts by weight of triethyleneglycoldimethacrylate, 2 parts by weight of aquahydroxy(1-phenyl-1,3-butanedionato)neodyinium, and 0.2 part by weight of azobis(2,4-dimethylvaleronitrile) were thoroughly mixed, the mixture was placed in a glass tube, the inside was repeatedly deaerated while purging with nitrogen, and sealed under vacuum. The sealed tube was heated at 30° C. for 10 hours, at 40° C. for 5 hours, at 60° C. for 3 hours, at 70° C. for 3 hours, and further heated in a hot air recirculation oven at 100° C. for 2 hours to obtain a round rod. The resulting round rod was cut and ground to prepare a contact lens.

The contact lens had a transmissivity of as low as 70% at 580 nm, and blocked ultraviolet light of less than 400 nm, and the transmissivity of other wavelength areas was more than 85%.

(EXAMPLE 12)

93 Parts by weight of 2-hydroxyethylmethacrylate, 2 parts by weight of ethyleneglycoldimethacrylate, 5 parts by weight of aquahydroxy(1-phenyl-1,3-butanedionato) erbium, and 0.05 part by weight of azobis(2,4-dimethylvaleronitrile) as a polymerization initiator were thoroughly mixed. The mixture was placed in a glass tube, the inside was repeatedly deaerated while purging with nitrogen, and sealed under vacuum. The sealed tube was heated in hot water at 30° C. for 10 hours, at 40° C. for 5 hours, at 60° C. for 3 hours, at 70° C. for 3 hours, and further heated in a hot air recirculation oven at 100° C. for 2 hours to obtain a round rod. The resulting round rod was cut and ground to prepare a contact lens. The contact lens was swollen and washed in pure water, immersed in physiological saline to complete dissolution of soluble substances. Aquahydroxy(1-phenyl-1,3-butanedionato)erbium was not detected in the dissolved substances.

The contact lens had a transmissivity of as low as 55% at 520 nm, and blocked ultraviolet light of less than 400 nm, and the transmissivity of other wavelength areas was more than 85%.

(EXAMPLE 13)

45 Parts by weight of 2,2,2-trifluoroethylmethacrylate, 40 parts by weight of tris(trimethylsiloxy)silylpropyl methacrylate, 10 parts by weight of 2-hydroxyethylmethacrylate, 3 parts by weight of ethyleneglycoldimethacrylate, 2 parts by weight of aquahydroxy(1-phenyl-1,3-butanedionato)neodimium, 2 parts by weight of aquahydroxy(1-phenyl-1,3-butanedionato)erbium, and 0.2 part by weight of azobis(2,4-dimethylvaleronitrile) as a polymerization initiator were thoroughly mixed, the mixture was placed in a glass tube, the inside was repeatedly deaerated while purging with nitrogen, and sealed under vacuum. The sealed tube was heated in hot water at 30° C. for 10 hours, at 40° C. for 5 hours, at 60° C. for 3 hours, at 70° C. for 3 hours, and further heated in a hot air recirculation oven at 100° C. for 2 hours to obtain a round rod. The resulting round rod was cut and ground to prepare a contact lens. The contact lens had a transmissivity of as low as 70% at 520 nm and 580 nm, and blocked ultraviolet light of less than 400 nm, and the transinissivity of other wavelength area was more than 85%.

In a dissolution test, dissolution of aquahydroxy(1-phenyl-1,3-butanedionato)neodymium, and aquahydroxy(1-phenyl-1,3-butanedionato)erbium was not noted.

(EXAMPLE 14)

To a hard coating solution comprising:

| | |
|---|---|
| Bifunctional urethane methacrylate of Formula (11) | 20 parts by weight |
| Dipentaerythritol hexaacrylate | 30 |
| Ethyleneoxide-modified succinic acid acrylate of the following Formula(22) | 5 |
| 2-Hydroxypropylmethacrylate | 20 |
| Isobornylacrylate | 30 |
| 2-Hydroxy-2-methyl-1-phenylpropane-1-one | 2 |

10 parts by weight of aquahydroxy(1-phenyl-1,3-butanedionato)neodymium was added and mixed. The hard coating solution was coated on a transparent polymethylmethacrylate plate of 200 mm×200 mm×2 mm, with the surface degreased, and irradiated with an 80 W/cm high-pressure mercury lamp for 30 seconds to obtain a hard coat film with a pencil hardness of 8H. The composite had a transmissivity of as low as 60% at 580 nm, blocked ultraviolet light of less than 400 nm, and transmissivity of other wavelength area was more than 85%. Therefore, the lens was one which had properties to selectively block or reduce only light of a specific wavelength but did not reduce other visible light, had a superior glare-proof function in light adaptation sight, and blocked ultraviolet light.

(22)

(EXAMPLE 15)

In 100 parts by weight of methylmethacrylate, 5 parts by weight of aquahydroxy(phenacylphenylketonato) neodymium and 5 parts by weight of aquahydroxy (phenacylphenylketonato) erbium were dissolved, and 2 parts by weight of benzoylperoxide was further added as a polymerization initiator and mixed. The mixture was placed in a sealable pressure vessel, connected to a vacuum line, thoroughly purged with nitrogen while cooling in a dry ice-methanol bath, sealed under vacuum, and block polymerized at 85° C. The product was formed to a display filter using an injection molding machine. The molding was gray-colored transparent article, and had an absorption at 520 nm and 580 nm. The transmissivities at both wavelengths were 20%, respectively. Further, it blocked ultraviolet light of less than 400 nm.

When the molding was used as a display filter, glare of the screen was eliminated, and contrast was improved without darkening the screen. Further, eye fatigue was not noted after looking the display for a long time.

Similar effects could be obtained when optical apparatus lenses and filters, and lighting apparatus covers were prepared using the same procedure.

(EXAMPLE 16)

To 100 parts by weight of polymethylmethacrylate, 5 parts by weight of aquahydroxy(1-phenyl-1,3-butanedionato) neodymium and 5 parts by weight of aquahydroxy(1-phenyl-1,3-butanedionato)erbium were mixed in an injection molding machine, and molded to a display filter. The molding was a gray-colored transparent article, and had an absorption at 520 nm and 580 nm. Transmissivities at both wavelengths were 20%, respectively, and it blocked ultraviolet of less than 400 nm.

When the molding was used as a display filter, the glare of the screen was eliminated, and contrast was improved without darkening the screen. Further, eye fatigue was not noted after looking the display for a long time.

Similar effects could be obtained when optical apparatus lenses and filters, and lighting apparatus covers were prepared using the same procedure.

(EXAMPLE 17)

100 Parts of polymethylmethacrylate was melted at 200° C., and 10 parts by weight of aquahydroxy(1-thiophenyl-1, 3-butanedionato)erbium was added and uniformly mixed. The mixture was reverted back to room temperature and then crushed into flakes. The result was molded to a display filter using an injection molding machine. The molding was transparent and slightly rose-colored, the transmissivity was 20% at 520 nm, blocked ultraviolet of less than 400 nm, and transmissivity of other wavelength area was about 85%.

When the molding was used as a display filter, glare of the screen was eliminated, and contrast was improved without darkening the screen. Further, eye fatigue was not noted after looking the display for a long time.

Similar effects could be obtained when optical apparatus lenses and filters, and lighting apparatus covers were prepared using the same procedure.

COMPARATIVE EXAMPLES

(Comparative Example 1)

Neodymium oxide, neodymium carbonate, neodymium chloride, neodymium nitrate, neodymium sulfate, neodymium sulfide, neodymium oxalate, neodymium acetate, and neodymium methacrylate were not soluble in monomers such as styrene, divinylbenzene, phenylmethacrylate, tetrahydrofurfuryl methacrylate, methylmethacrylate, benzylmethacrylate, diallylphthalate, diethyleneglycolbisallylcarbonate, o-chlorostyrene, and the like.

(Comparative Example 2)

Four grams of trisbenzoylacetonatoneodymium produced by the production method shown below was dissolved in 100 g of toluene and checked for changes over time under irradiation with a fluorescent lamp. As a result, the solution, which was initially blue-violet colored, became green with the passage of time, and after 2 weeks, it became yellow and produced a yellow precipitate.

Production method of trisbenzoylacetonatoneodymium is shown below. 2.43 g of benzoylacetone was dissolved in 5% aqueous ammonia solution, and the benzoylacetone-ammonia water solution was added to an aqueous neodymium acetate solution obtained by dissolving 1.70 g of neodymium acetate hydrate in 50 ml of water to obtain a crystal of blue-violet trisbenzoylacetonatoneodymium.

(Comparative Example 3)

The photopolymerization composition used in Example 1 was injected into a cast molding die comprising two glass molds and a plastic gasket, and irradiated continuously for 3 minutes with ultraviolet light of an illuminance of 400 mW/cm² using a 2 KW high-pressure mercury lamp from both sides of the molding die to obtain a 2 mm thick highly transparent plate-formed polymer. After the plate-formed polymer was allowed to stand in a high temperature and high humidity environment at 60° C. and 90% RH for one week, the water absorption was 1.0%. This was the same value as the lens of Example 1 which contained aquahydroxy(1- phenyl-1,3-butanedionato)neodymium. After the plate-formed polymer was provided on the surface with a reflection-proof film and allowed to stand in the above high temperature and high humidity environment for one week, no cracking was noted in the deposited film.

(Comparative Example 4)

Three parts by weight of neodymium acetate was dissolved in 20 parts by weight of methacrylic acid, and mixed with 80 parts by weight of the photopolymerization composition of Example 1. The mixture was injected into a cast molding die comprising two glass molds and a plastic gasket, and irradiated continuously for 3 minutes with ultraviolet light of an illuminance of 400 mW/cm$^2$ using a 2 KW high-pressure mercury lamp from both sides of the molding die to obtain a 2 mm thick blue-violet colored highly transparent plate-formed polymer. The thus obtained plate-formed polymer had a transmissivity of as low as 30% at 580 nm, and the transmissivity of other wavelength areas was more than 90%, but did not block ultraviolet light of less than 400 nm, and after the plate-formed polymer was allowed to stand in a high temperature and high humidity environment at 60° C. and 90% RH for one week, the water absorption was as high as 5.0%. After the plate-formed polymer was provided on the surface with an inorganic deposited film as a reflection-proof film and allowed to stand in the above high temperature and high humidity environment for one week, cracking was generated in the deposited film.

(Comparative Example 5)

Two parts by weight of neodymium acetate, in place of aquahydroxy(1-phenyl-1,3-butanedionato)neodymium, was dissolved in 15 parts by weight of methacrylic acid under heating, mixed with 30.6 parts by weight of styrene, 51 parts by weight of 2,2-bis(4-methacroyloxyethoxy-3,5-dibromophenyl)propane, 3.4 parts by weight of diethyleneglycolbisallylcarbonate, and 1 part by weight of t-butylperoxyneodecanoate, and filtered. The filtrate was injected into a mold comprising two glass molds and a gasket of ethylene-vinyl acetate copolymer, and polymerized as in Example 2. After polymerization, the lens was released from the molding die. Further, the lens was annealed at 100° C. for 2 hours.

The resulting lens had a transmissivity of as low as 40% at 580 nm, and the transmissivity of other wavelength areas was more than 85%. However, it did not block ultraviolet light of less than 400 nm. The resulting lens was allowed to stand in a high temperature and high humidity environment at 60° C. and 90% RH for one week as in Example 2. As a result, the water absorption was 3.0% which was 3 times higher than Example 2, and a negative strength lens generated a curved deflection at the central portion. After the plate-formed polymer was provided on the surface with an inorganic deposition film as a reflection-proof film and allowed to stand in the above high temperature and high humidity environment for one week, generation of cracking was noted in the deposition film.

(EXAMPLE 18)

After 36 parts by weight of styrene, 60 parts by weight of 2,2-bis(4-methacroyloxyethoxy-3,5-dibromophenyl) propane, 4 parts by weight of diethyleneglycolbisallylcarbonate, and 2 phm of aquahydroxy(1-phenyl-1,3-butanedionato)neodymium of Synthesis Example 2 were mixed, 1 phm of t-butylperoxyneodecanoate as an initiator was added, further agitated and filtered. The filtrate was injected into a mold, comprising two glass flat plates and a gasket of ethylenevinyl acetate copolymer,whose clearances are 2 mm, 3 mm, 4 mm, 5 mm, and 10 mm.

Then, the filtrate was heated at 30° C. for 4 hours, linearly increased from 30° C. to 50° C. over a period of 10 hours, linearly increased from 50° C. to 80° C. in 2 hours, maintained at 80° C. for 1 hour, and cooled to 70° C. in 2 hours.

The gasket was removed, and the resulting molding was separated from the glass flat plates. The resulting molding was annealed at 100° C. for 2 hours.

In the same method, flat moldings of 2 mm, 3 mm, 4 mm, and 5 mm in thickness were obtained with a content of aquahydroxy(1-phenyl-1,3-butanedionato)neodymium of 5 phm. Further, flat molding of 1 mm, 2 mm, and 3 mm in thickness were obtained with a content of aquahydroxy(1-phenyl-1,3-butanedionato)neodymium of 10 phm.

The thus obtained moldings had high transparency.

Figure 7:
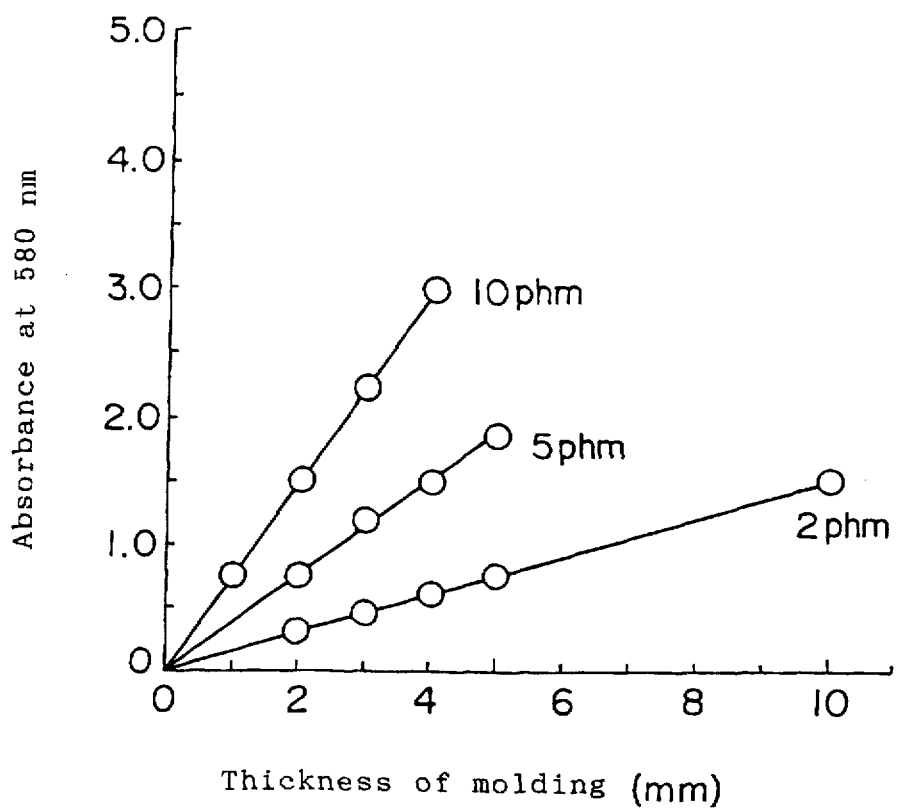
FIG. 7 is a diagram showing the thickness of the molding vs. absorbance at 580 nm in the molding of Example 18.

Thicknesses of the resulting moldings and the absorbances at 580 nm which is the characteristic absorption wavelength of neodymium atom are shown in FIG. 7.

The results show that when the thickness of the molding is to be reduced, sufficient objective effects (glare-proof effect, eye fatigue prevention effect) can be obtained by increasing the content of the two-coordination complex.

(EXAMPLE 19)

To a mixture comprising 45 parts by weight of a mixture of 2,2'-(p-xylene-a,a'-dithio)diethyldimethacrylate of the following Formula (a) and 2-[4-(2-hydroxyethylthiomethylene)benzylthio]ethylmethacrylate of the following Formula (b), 10 parts by weight of benzylmethacrylate, 10 parts by weight of methylmethacrylate, 10 parts by weight of isobornylmethacrylate, and 25 parts by weight of tetraethyleneglycoldimethacrylate, 20000 ppm of 2,4-diphenyl-4-methyl-1-petene (Nippon Yushi: NOFMER MSD) as a radical polymerization controller, 2000 ppm of hindered amine type photostabilizer LA63P (Asahi Denka) as a photostabilizer, and 2000 ppm of trisisodecylphosphite (Asahi Denka: MARK 3010) as an antioxidant were added and mixed.

To the mixture, 5 phm of aquahydroxy(1-phenyl-1,3-butanedionato)neodymium of the Synthesis Example and 5 phm of aquahydroxy(1-phenyl-1,3-butanedionato)erbium were added, and 0.2 phm of t-butylperoxyneodecanoate and 0.6 phm of t-butylperoxyisobutyrate as radical polymerization initiators were further added and mixed. The resulting mixture was filtered, and the filtrate was injected into a cast molding die comprising two glass molds and a gasket of ethylene-vinyl acetate copolymer to obtain of 2 mm of center thickness.

Then, the molding die was heated at 30° C. for 10 hours, linearly increased from 30° C. to 40° C. in 3 hours, linearly increased from 40° C. to 45° C. in 2 hours, from 45° C. to 55° C. in 1 hour, from 55° C. to 70° C. in 1 hour, from 70° C. to 100° C. in 2 hours, maintained at 100° C. for 2 hours, and cooled from 100° C. to 70° C. in 2 hours.

The gasket was removed from the cast molding die comprising the gasket and the glass molds, and the resin molding was separated from the glass molds. The resulting resin molding was annealed at 100° C. for 2 hours.

The resulting lens had a refractive index of 1.55, the light transmissivity was as low as 18% at 520 nm and 580 nm, blocked ultraviolet light of less than 400 nm in wavelength, and transmissivity of other wavelength area was more than 85%. Therefore, the lens was one which had a superior glare-proof function to selectively block or reduce only light of a specific wavelength but did not reduce other visible light both in light adaptation sight and in dark adaptation sight, and blocked ultraviolet light. The lens showed an achromatic gray under sunlight, pale green under a fluorescent lamp, and pale rose under an incandescent lamp.

Further, after the lens was allowed to stand in a high temperature and high humidity environment at 60° C. and 90% RH for one week, the water absorption was 1.0%, which was fairly good. After the lens was provided on the surface with an inorganic deposition film as a reflection-proof film and allowed to stand in the above high temperature and high humidity environment for one week, no cracking was noted in the deposition film. The transmissivity in the area other than 520 nm and 580 nm was 99%.

When letters, a still picture, and an animation on a CRT display screen were viewed through the lens, glare on the screen was eliminated, and the contrast was improved without darkening the screen.

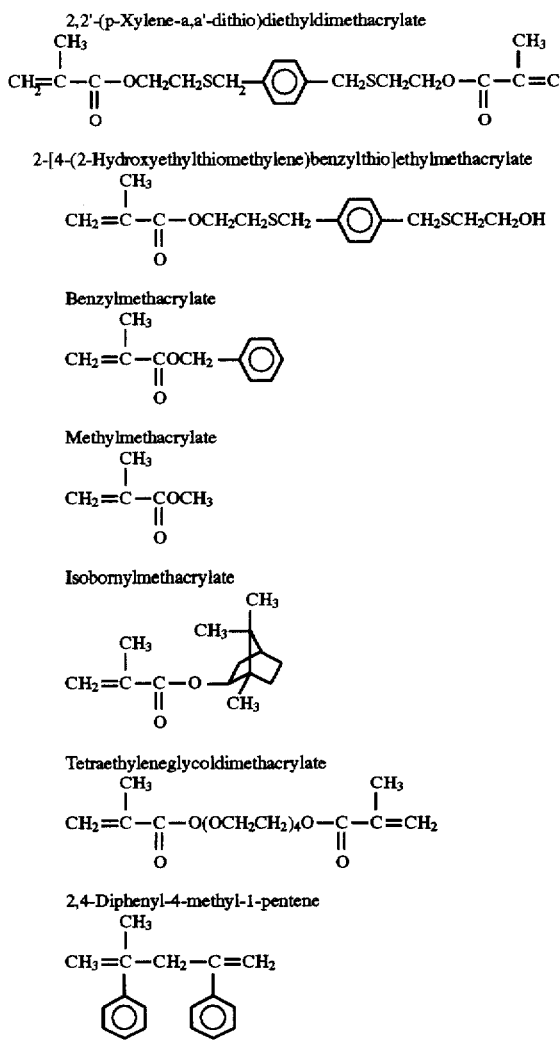

(EXAMPLE 20)

To a mixture comprising 45 parts by weight of a mixture of 2,2'-(p-xylene-a,a'-dithio)diethyldimethacrylate of the following Formula (a) and 2-[4-(2-hydroxyethylthiomethylene)benzylthio]ethylmethacrylate of the following Formula (b), 10 parts by weight of benzylmethacrylate, 20 parts by weight of isobornylmethacrylate, and 25 parts by weight of tetraethyleneglycoldimethacrylate, 20000 ppm of 4-diphenyl-4-methyl-1-pentene (Nippon Yushi: NOFMER MSD) as a radical polymerization controller, 2000 ppm of hindered amine type photostabilizer LA63P (Asahi Denka) as a photostabilizer, and 2000 ppm of trisisodecylphosphite (Asahi Denka: MARK 3010) as an antioxidant were added and mixed.

To the mixture, 3 phm of aquahydroxy(1-phenyl-1,3-butanedionato)neodymium of Synthesis Example 1 and 3 phm of aquahydroxy(1-phenyl-1,3-butanedionato)erbium were added, and 0.2 phm of t-butylperoxyneodecanoate and 0.6 phm of t-butylperoxyisobutyrate as radical polymerization initiators were further added and mixed. The resulting mixture was filtered, and the filtrate was injected into a cast molding die comprising two glass molds and a gasket of ethylene-vinyl acetate copolymer to obtain lenses of 2mm of center thickness. Then, the molding die was heated at 30° C. for 10 hours, linearly increased from 30° C. to 40° C. in 3 hours, linearly increased from 40° C. to 45° C. in 2 hours, from 45° C. to 55° C. in 1 hour, from 55° C. to 70° C. in 1 hour, from 70° C. to 100° C. in 2 hours, maintained at 100° C. for 2 hours, and cooled from 100° C. to 70° C. in 2 hours.

The gasket was removed from the cast molding die comprising the gasket and the glass molds, and the resin molding was separated from the glass molds. The resulting resin molding was annealed at 100° C. for 2 hours.

The resulting lens had a refractive index of 1.55, the light transmissivity was as low as 36% at 520 nm and 580 nm, blocked ultraviolet light of less than 400 nm in wavelength, and the transmissivity of other wavelength areas was more than 85%. Therefore, the lens was one which had a superior glare-proof function to selectively block or reduce only light of a specific wavelength but did not reduce other visible light both in light adaptation sight and in dark adaptation sight, and blocked ultraviolet light. The lens showed an achromatic gray color under sunlight, pale green under a fluorescent lamp, and pale rose tinder an incandescent lamp.

Further, after the lens was allowed to stand in a high temperature and high humidity environment at 60° C. and 90% RH for one week, the water absorption was 1.0%, which was fairly good. After the lens was provided on the surface with an inorganic deposited film as a reflection-proof film and allowed to stand in the above high temperature and high humidity environment for one week, no cracking was noted in the deposited film. The transmissivity in the area other than 520 nm and 580 nm was 99%.

When letters, a still picture, and an animation on a CRT display screen were viewed through the lens, glare on the screen was eliminated, and the contrast was improved without darkening the screen.

(EXAMPLE 21)

The mixture prepared in Example 20 was injected into a cast molding die comprising a glass mold for progressive multiple focus lens (SEIKO PLACKS II GXP-1S) as a farsighted eyeglass lens and a gasket of ethylene-vinyl acetate copolymer. The molding die was treated using the same procedure as in Example 20 to obtain a resin-based progressive multiple focus lens. The resulting lens was annealed for 2 hours, and provided on the surface with an inorganic deposition film as a reflection-proof film.

The lens of the present example was attached to an eyeglass frame and subjected to a wearing test. The test was conducted by the same method as in Example 5. As a comparison, a lens of the same composition as Example 20 except that aquahydroxy(1-phenyl-1,3-butanedionato) neodymium and aquahydroxy(1-phenyl-1,3-butanedionato) erbium were removed, dyed to the same color (gray) as the lens of the present example, and provided with a reflection-proof film, was used. The results are shown in Table 10.

TABLE 10

| Item | Example 21 Average | Example 21 Variance | Comparative Average | Comparative Variance |
|---|---|---|---|---|
| Glare reduction | 4.80 | 0.2 | 2.90 | 0.2 |
| Eye fatigue prevention | 4.90 | 0.1 | 2.88 | 0.1 |
| Lightness of sight | 4.40 | 0.3 | 4.33 | 0.3 |
| Contrast | 4.80 | 0.2 | 2.80 | 0.2 |

(EXAMPLE 22)

To a composition comprising:

| | |
|---|---|
| Isocyanurate derivative having a triazine skeleton and metharylic group in the molecule of the following Formula (a) | 70 parts by weight |
| Benzyl methacrylate | 30 parts by weight |
| t-Butylperoxyneodecanoate | 0.5 phm | butanedionato)neodymium was added, mixed and dissolved, and filtered. The filtrate was injected into a molding die comprising two glass molds and a gasket of ethylene-vinyl acetate copolymer to obtain lenses of 2 mm of center thickness.

Then, the molding die was heated at 30° C. for 5 hours, increased from 30° C. to 80° C. over a period of 10 hours, maintained at 80° C. for 2 hours, cooled from 80° C. to 70° C. in 2 hours, and the molding was released from the molding die. The resulting molding was annealed at 100° C. for 2 hours.

The light transmissivity of the resulting molding was as low as 20% at 580 nm, blocked ultraviolet light of less than 400 nm in wavelength, and transmissivity of other wavelength area was more than 85%.

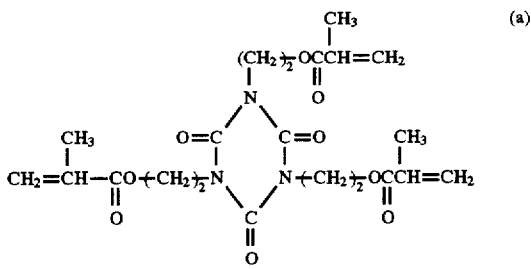

(EXAMPLE 23)

To a composition comprising:

| | |
|---|---|
| Polyester methacrylate of the following Formula (b) | 60 parts by weight |
| Ethyleneglycol dimethacrylate of Formula (c) | 20 parts by weight |
| Benzyl methacrylate | 10 parts by weight |
| t-Butylperoxyneodecanoate | 0.5 phm |

5 parts by weight of aquahydroxy(1-phenyl-1,3-butanedionato)neodymium was added, mixed and dissolved, and filtered.

The filtrate was injected into a molding die comprising two glass molds and a gasket of ethylene-vinyl acetate copolymer to obtain lenses of 2 mm of center thickness.

Then, the molding die was heated at 30° C. for 5 hours, increased from 30° C. to 80° C. over a period of 10 hours, maintained at 80° C. for 2 hours, cooled from 80° C. to 70° C. in 2 hours, and the molding was released from the molding die. The resulting molding was annealed at 100° C. for 2 hours.

The light transmissivity of the resulting molding was as low as 20% at 580 nm, blocked ultraviolet light of less than 400 nm in wavelength, and transmissivity of other wavelength area was more than 85%.

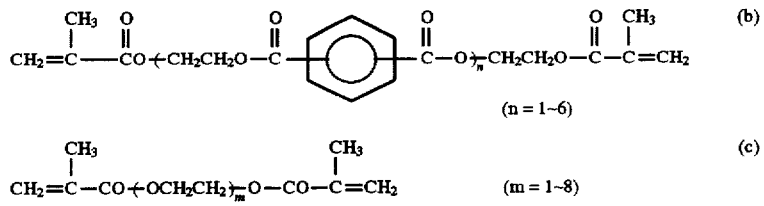

(EXAMPLE 24)

The flat-formed molding obtained in Example 18 was attached to an eyeglass frame, used by randomly extracted 50 men and 50 women engaged in VDT work, and eye fatigue when conducted a wordprocessor input work (VDT work) of 5000 characters was evaluated in a 5-grade method.

Figure 8:
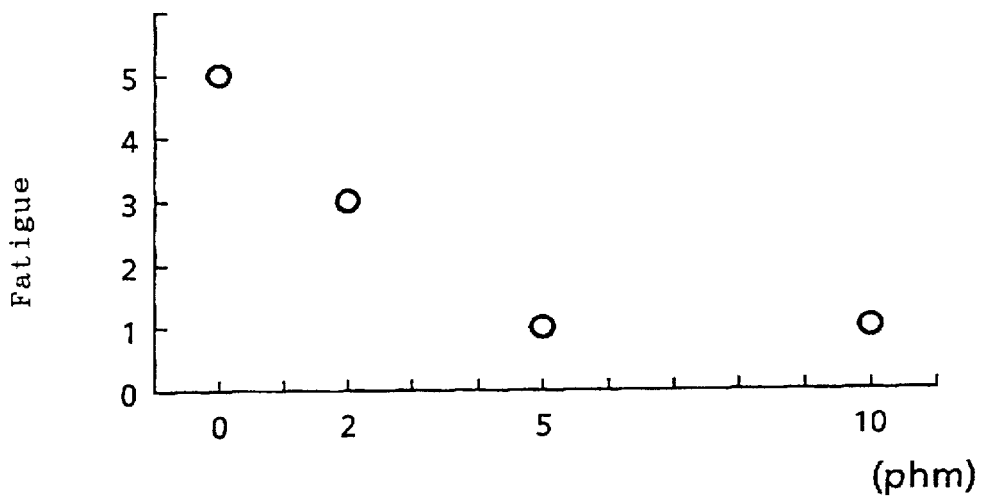
FIG. 8 is a diagram showing the relationship between the content of aquahydroxy(1-phenyl-1,3-butanedionato) neodymium and the degree of fatigue in the molding of Example 24.
Figure 9:
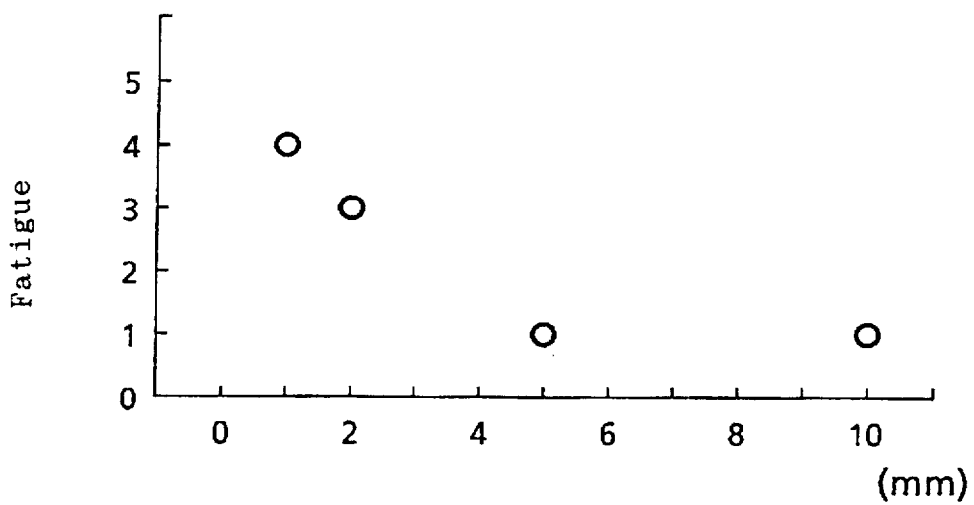
FIG. 9 is a diagram showing the relationship between the thickness of the molding after aquahydroxy(1-phenyl-1,3-butanedionato)neodymium and the degree of fatigue in the molding of Example 24.

The test results are shown in FIG. 8 and FIG. 9.

Questions for evaluation were set as follows.

5 points: feel considerable eye fatigue (e.g. eye pain, dim sight, etc.).

4 points: between 3 and 5.

3 points: feel an eye fatigue.

2 points: between 1 and 3.

1 point: feel almost no eye fatigue.

0 point: feel no eye fatigue at all.

UTILIZABILITY IN INDUSTRY

The transparent plastic material of the present invention is useful for eyeglass lenses, contact lenses, intraocular lenses, sunglasses, display filter covers, lighting apparatus covers, automotive mirrors, and optical apparatus lenses and filters for cameras. Further, the material is also used as a hard copy for eyeglass lenses and optical apparatus lenses.

We claim:

1. A transparent plastic material comprising a polymer obtained by polymerizing one or more polymerizable monomers in the presence of a polymerization initiator or polymerization catalyst, wherein said polymer contains a complex compound of Formula (I),

  (I)

wherein M denotes Sc, Y, La, Pt, Nd, Pm, Sm, Gd, Dy, Ho, Er, Tm, or Lu; A is a ligand for forming a chelate complex having a basic structure shown below,

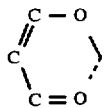

and containing at least one of an aryl group and a heterocyclic group.

2. The transparent plastic material of claim 1, wherein said polymerizable monomer contains a radical polymerizable group.

3. The transparent plastic material of claim 1, wherein said polymerizable monomer contains a polyaddition polymerizable group.

4. The transparent plastic material of claim 1, wherein said polymerizable monomer contains a polycondensation polymerizable group.

5. An optical article comprising the transparent plastic material of claim 1.

6. The optical article of claim 5, wherein said optical article is an eyeglass lens.

7. The optical article of claim 5, wherein said optical article is a farsighted eyeglass lens.

8. The optical article of claim 5, wherein said optical article is a contact lens.

9. The optical article of claim 5, wherein said optical article is a display filter.

10. The optical article of claim 5, wherein said optical article is an optical apparatus lens or filter.

11. The optical article of claim 5, wherein a thin film layer of said polymer of claim 1 is formed on a substrate comprising a transparent plastic material.

12. The optical article of claim 11, wherein said substrate comprising a transparent plastic material is an optical apparatus lens or a filter including an eyeglass lens, sunglasses, display filter cover, a lighting apparatus cover, an automotive mirror, and a camera.

13. The transparent plastic material of claim 1, wherein said polymer comprises a styrene transparent plastic material comprising styrene and/or a styrene derivative.

14. The transparent plastic material of claim 1, wherein said polymer comprises an isocyanurate transparent plastic material comprising an isocyanurate derivative having a triazine skeleton and a radical polymerizable group in the molecule.

15. The transparent plastic material of claim 1, wherein said polymer comprises a urethane(meth)acrylate transparent plastic material comprising an urethane(meth)acrylate obtained by reacting an isocyanate group containing compound with a hydroxy group containing compound.

16. The transparent plastic material of claim 1, wherein said polymer comprises a polyester(meth)acrylate transparent plastic material comprising a polyester(meth)acrylate having a polyester structure in the molecule.

17. The transparent plastic material of claim 2, wherein said polymer is obtained by polymerizing a composition comprising a (meth)acrylic monomer containing sulfur in the molecule.

18. An optical article comprising a polymer obtained by polymerizing a radical polymerizable monomer comprising 40 to 60 parts by weight of a (meth)acrylate containing a sulfur atom in the molecule of Formula (II),

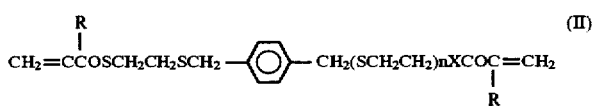  (II)

wherein R is a hydrogen atom or a methyl group, X is a sulfur atom or an oxygen atom, and n is an integer from 0 to 3, 10 to 30 parts by weight of an aliphatic (meth)acrylate, and 10 to 30 parts by weight of polyethyleneglycoldimethacrylate in the presence of a radical polymerization initiator, wherein said polymer comprises a transparent plastic material containing a complex compound of Formula (I) and wherein said optical article is an eyeglass lens

  (I)

wherein M denotes Sc, Y, La, Pt, Nd, Pm, Sm, Gd, Dy, Ho, Er, Tm, or Lu; A is a ligand for forming a chelate complex having a basic structure shown below,

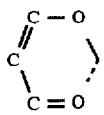

and containing at least one of an aryl group and a heterocyclic group.

19. The optical article of claim 18, wherein M of said complex compound of Formula (I) is one of Nd, Er, and Ho, and a content thereof is 2 to 15 phm based on the polymerizable monomer.

20. The optical article of claim 19, wherein M of said complex compound of Formula (I) is Nd and Er, and a content thereof is 2 to 15 phm each based on the polymerizable monomer.

21. The optical article of claim 19, wherein M of said complex compound of Formula (I) is Nd, Er, and Ho, and a content thereof is 2 to 15 phm each based on the polymerizable monomer.

22. The transparent material of claim 1 produced by polymerizing (1) one or more polymerizable monomers in the presence of (2) a polymerization initiator or a polymerization catalyst.

23. The transparent material of claim 22 produced, by changing a composition containing (1) one or more polymerizable monomers, (2) a polymerization initiator or a polymerization catalyst and (3) said complex compound of Formula (I) is into a mold, and polymerizing said composition in the mold.

24. The transparent material of claim 22, produced by polymerizing a composition containing (1) one or more polymerizable monomers, (2) a polymerization initiator or a polymerization catalyst thereafter melting the product, the molten product is mixed with (3) a complex compound of Formula (I) for uniform dissolution and is solidified, and the solidified product is remelted and resolidified in a mold of a molding machine to obtain the polymer.

25. The transparent material of claim 22, produced by polymerizing a composition containing (1) one or more polymerizable monomers and (2) a polymerization initiator or a polymerization catalyst mixed with (3) said complex compound of Formula (I) and resolidifying of such.

26. The transparent material of claim 22, produced by polymerizing a composition containing (1) one or more polymerizable monomers, (2) a polymerization initiator or a polymerization catalyst, and (3) said complex compound of Formula (I), and thereafter, melting the polymerization product and then solidified such in a mold of a molding machine.

27. The transparent plastic material of claim 1, wherein said polymer is obtained by polymerizing a composition comprising a multifunctional (meth)acrylic monomer.

28. The transparent plastic material of claim 27, wherein said multifunctional (meth)acrylic monomer contains sulfur in the molecule.

29. The transparent plastic material of claim 28, wherein said multifunctional (meth)acrylic monomer containing sulfur in the molecule is a monomer of Formula (a):

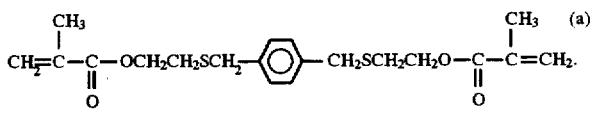

30. The transparent plastic material of claim 29, wherein said composition further comprises an aromatic (meth)acrylate and tetraethyleneglycol di(meth)acrylate.

31. The transparent plastic material of claim 30, wherein said aromatic (meth)acrylate is selected from the group consisting of benzyl(meth)acrylate and isobornyl(meth)acrylate.

* * * * *